United States Patent
Takusari

(10) Patent No.: US 9,760,937 B2
(45) Date of Patent: Sep. 12, 2017

(54) INFORMATION PROVIDING APPARATUS, INFORMATION PROVIDING METHOD, AND USER DEVICE

(71) Applicant: YAHOO JAPAN CORPORATION, Tokyo (JP)

(72) Inventor: Tomohito Takusari, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 832 days.

(21) Appl. No.: 14/105,910

(22) Filed: Dec. 13, 2013

(65) Prior Publication Data
US 2014/0195375 A1 Jul. 10, 2014

(30) Foreign Application Priority Data

Jan. 4, 2013 (JP) .................. 2013-000061

(51) Int. Cl.
*G06Q 30/06* (2012.01)
(52) U.S. Cl.
CPC ................ *G06Q 30/0633* (2013.01)
(58) Field of Classification Search
USPC ......................................... 705/26.8
See application file for complete search history.

(56) References Cited

U.S. PATENT DOCUMENTS

| | | | | |
|---|---|---|---|---|
| 6,587,835 B1 * | 7/2003 | Treyz | ..................... | G06Q 20/12 705/14.64 |
| 8,160,929 B1 * | 4/2012 | Park | ..................... | G06Q 30/00 705/26.1 |
| 8,265,256 B1 * | 9/2012 | Croak | ..................... | G06Q 30/06 370/352 |
| 2002/0174021 A1 * | 11/2002 | Chu | ..................... | G06Q 10/063 705/7.11 |
| 2002/0174026 A1 * | 11/2002 | Pickover | ..................... | G06Q 30/0601 705/26.1 |

(Continued)

FOREIGN PATENT DOCUMENTS

| | | |
|---|---|---|
| JP | A-2004-252780 | 9/2004 |
| JP | A-2009-146068 | 7/2009 |

(Continued)

OTHER PUBLICATIONS

Japanese Office Action issued in Japanese Patent Application No. 2013-000061 on Jun. 10, 2014 (with translation).

Primary Examiner — Ashford S Hayles
(74) Attorney, Agent, or Firm — Oliff PLC

(57) ABSTRACT

An information providing apparatus receives wish information relevant to a wish item that a user wishes to have and position information of the user. The information providing apparatus transmits the wish information to a provider device used by a provider who provides items. The information providing apparatus receives provision information relevant to provision of the wish item from the provider device. The information providing apparatus determines whether a moving cost, which is required for moving from a position indicated by the position information to a providing place at which the provider provides the wish item, satisfies a predetermined condition. The information providing apparatus notifies a user device of the provision information corresponding to a provider in which the moving cost satisfies the predetermined condition.

12 Claims, 13 Drawing Sheets

(56) References Cited

U.S. PATENT DOCUMENTS

| | | | |
|---|---|---|---|
| 2004/0117195 A1* | 6/2004 | Bodin | G06Q 10/20 705/39 |
| 2005/0165647 A1* | 7/2005 | Razumov | G06Q 10/0637 705/7.36 |
| 2006/0079247 A1* | 4/2006 | Ritter | G01S 5/0289 455/456.1 |
| 2006/0155608 A1* | 7/2006 | Bantz | G06Q 30/016 705/26.43 |
| 2007/0033113 A1* | 2/2007 | Trew | G01N 33/5064 705/26.5 |
| 2007/0067225 A1* | 3/2007 | Fabris | G06Q 10/02 705/26.41 |
| 2007/0124216 A1* | 5/2007 | Lucas | G06Q 10/087 705/26.1 |
| 2007/0150369 A1* | 6/2007 | Zivin | G06Q 30/02 705/26.64 |
| 2009/0012704 A1* | 1/2009 | Franco | G01C 21/20 701/532 |
| 2009/0292463 A1* | 11/2009 | Chase | G01C 21/343 701/533 |
| 2009/0320047 A1* | 12/2009 | Khan | G06F 9/542 719/318 |
| 2009/0326800 A1* | 12/2009 | Kalaboukis | H04W 4/02 701/533 |
| 2010/0027527 A1* | 2/2010 | Higgins | H04W 4/18 370/351 |
| 2010/0262449 A1* | 10/2010 | Monteforte | G06Q 30/02 705/7.34 |
| 2011/0071889 A1* | 3/2011 | Erhart | G06Q 30/00 705/14.16 |
| 2012/0123673 A1* | 5/2012 | Perks | G06Q 30/0631 701/426 |
| 2012/0203668 A1* | 8/2012 | Howard | G06Q 10/087 705/26.64 |
| 2012/0296565 A1* | 11/2012 | Liu | G06Q 30/0207 701/439 |
| 2013/0080289 A1* | 3/2013 | Roy | G06Q 10/10 705/26.8 |
| 2013/0110624 A1* | 5/2013 | Mitrovic | G06Q 30/0261 705/14.53 |
| 2013/0110639 A1* | 5/2013 | So | G06Q 30/02 705/14.66 |
| 2013/0173421 A1* | 7/2013 | Bandara | G06Q 20/12 705/26.8 |
| 2013/0198031 A1* | 8/2013 | Mitchell | G01C 21/3476 705/26.8 |
| 2013/0211953 A1* | 8/2013 | Abraham | G06Q 30/06 705/26.8 |
| 2013/0218463 A1* | 8/2013 | Howard | G06F 17/30657 701/533 |
| 2013/0238370 A1* | 9/2013 | Wiseman | G06Q 10/02 705/5 |
| 2013/0246219 A1* | 9/2013 | Mishanski | G06Q 30/00 705/26.9 |
| 2013/0297357 A1* | 11/2013 | Shih | G06Q 10/02 705/5 |
| 2013/0311335 A1* | 11/2013 | Howard | G06F 3/017 705/26.64 |
| 2014/0052562 A1* | 2/2014 | Oliveira | G06Q 30/0643 705/26.5 |
| 2014/0067564 A1* | 3/2014 | Yuan | G06Q 30/0633 705/16 |
| 2014/0095273 A1* | 4/2014 | Tang | G06Q 30/0207 705/14.1 |
| 2014/0095285 A1* | 4/2014 | Wadell | G06Q 30/00 705/14.25 |
| 2014/0121967 A1* | 5/2014 | Anbalagan | G01C 21/3476 701/540 |
| 2014/0156392 A1* | 6/2014 | Ouimet | G06Q 30/02 705/14.49 |
| 2014/0156450 A1* | 6/2014 | Ruckart | G06Q 30/0639 705/26.8 |
| 2014/0180864 A1* | 6/2014 | Orlov | G06Q 30/0631 705/26.7 |
| 2015/0095197 A1* | 4/2015 | Eramian | G06Q 50/30 705/26.64 |
| 2015/0095199 A1* | 4/2015 | Blair, II | G06Q 30/0635 705/26.81 |
| 2015/0169699 A1* | 6/2015 | Gilbert | G06F 3/04842 707/722 |

FOREIGN PATENT DOCUMENTS

| | | |
|---|---|---|
| JP | A-2009-181542 | 8/2009 |
| JP | A-2012-083971 | 4/2012 |
| JP | A-2012-103886 | 5/2012 |
| JP | A-2012-168622 | 9/2012 |

* cited by examiner

| ITEM ID | ITEM NAME | STOCK QUANTITY | SALES PRICE |
|---|---|---|---|
| C1 | TELEVISION | 1 | 20000 |
| C2 | REFRIGERATOR | 3 | 45000 |
| ... | ... | ... | ... |

FIG.8

| REQUEST ID | PURCHASE WISH ITEM | PROVISION INFORMATION ||||||
|---|---|---|---|---|---|---|
| | | SHOP ID | STOCK QUANTITY | SALES PRICE | PLACE OF SALE | PAYMENT METHOD |
| Q1 | TELEVISION | A11 | 1 | 20000 | ···MINATO-KU, TOKYO | CASH, CREDIT |
| | | A12 | 2 | 22000 | ···MINATO-KU, TOKYO | CASH |
| Q2 | ⋮ | ⋮ | ⋮ | ⋮ | ⋮ | ⋮ |
| ⋮ | ⋮ | ⋮ | ⋮ | ⋮ | ⋮ | ⋮ |

| USER ID | PURCHASE WISH INFORMATION | POSITION INFORMATION | PURCHASE WISH TIME-LIMIT |
|---|---|---|---|
| U1 | TELEVISION | M11 | 2012/12/23 |
| | NECKTIE | M12 | 2013/1/10 |
| | ... | ... | ... |
| U2 | ... | ... | ... |
| ... | ... | ... | ... |

FIG.15

| USER ID | PURCHASE WISH ITEM | PURCHASE WISH TIME-LIMIT | PROVISION INFORMATION | | | | |
|---|---|---|---|---|---|---|---|
| | | | SHOP ID | STOCK QUANTITY | SALES PRICE | PLACE OF SALE | PAYMENT METHOD |
| U1 | TELEVISION | 2012/12/23 | A11 | 1 | 20000 | ...MINATO-KU, TOKYO | CASH, CREDIT |
| U2 | ... | 2013/1/10 | ... | ... | ... | ... | ... |
| ... | ... | ... | ... | ... | ... | ... | ... |

424

INFORMATION PROVIDING APPARATUS, INFORMATION PROVIDING METHOD, AND USER DEVICE

CROSS-REFERENCE TO RELATED APPLICATIONS

The present application claims priority to and incorporates by reference the entire contents of Japanese Patent Application No. 2013-000061 filed in Japan on Jan. 4, 2013.

BACKGROUND OF THE INVENTION

1. Field of the Invention

The present invention relates to an information providing apparatus, an information processing method, and a user device.

2. Description of the Related Art

Conventionally, with a rapid spread of the Internet, users view information on items to be purchased using the Internet. In recent years, a technique in which a user inputs a wish condition, and an item matching the wish condition is provided to the user is known. Moreover, a technique in which wish information of a user and a response from a shop are mediated between the user and the shop to provide information on a shop at which the user can purchase the item to the user is known.

However, in the conventional technique, it is difficult to provide information on a shop at which the user can practically purchase an item. For example, the conventional technique just provides the information on a shop in which a purchase wish item is stored in stock but cannot provide the information on a shop at which the user can purchase an item geographically. For example, in the conventional technique, even when the information on a shop located within a predetermined distance about a present location of the user is provided, for example, a user who purchases an item while being out of home cannot be said to wish to purchase the item at a shop in which the straight line distance from the present location is short, and it may not be practical for the user to purchase the item at a nearby shop depending on other factors such as a transportation cost. As above, in the conventional technique, it is not necessarily possible to provide the information on a shop at which the user can practically purchase an item.

SUMMARY OF THE INVENTION

It is an object of the present invention to at least partially solve the problems in the conventional technology.

According to one aspect of an embodiment, an information providing apparatus includes a wish information receiving unit configured to receive wish information relevant to a wish item or a wish service that a user wishes to have and position information of the user from a user device that the user uses; a transmitting unit configured to transmit the wish information received by the wish information receiving unit to a provider device used by a provider who provides items or services; a provision information receiving unit configured to receive provision information relevant to provision of the wish item or the wish service from the provider device; a determining unit configured to determine whether a moving cost, which is required for moving from a position indicated by the position information to a providing place at which the provider provides the wish item or the wish service, satisfies a predetermined condition; and a notifying unit configured to notify the user device of the provision information corresponding to a provider in which the determining unit determines that the moving cost satisfies the predetermined condition.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating an example of a request information table according to the first embodiment;

FIG. 14 is a diagram illustrating an example of a wish information storage unit according to the third embodiment;

FIG. 15 is a diagram illustrating an example of a provision information storage unit according to the third embodiment.

DETAILED DESCRIPTION OF THE PREFERRED EMBODIMENTS

Figure 1:
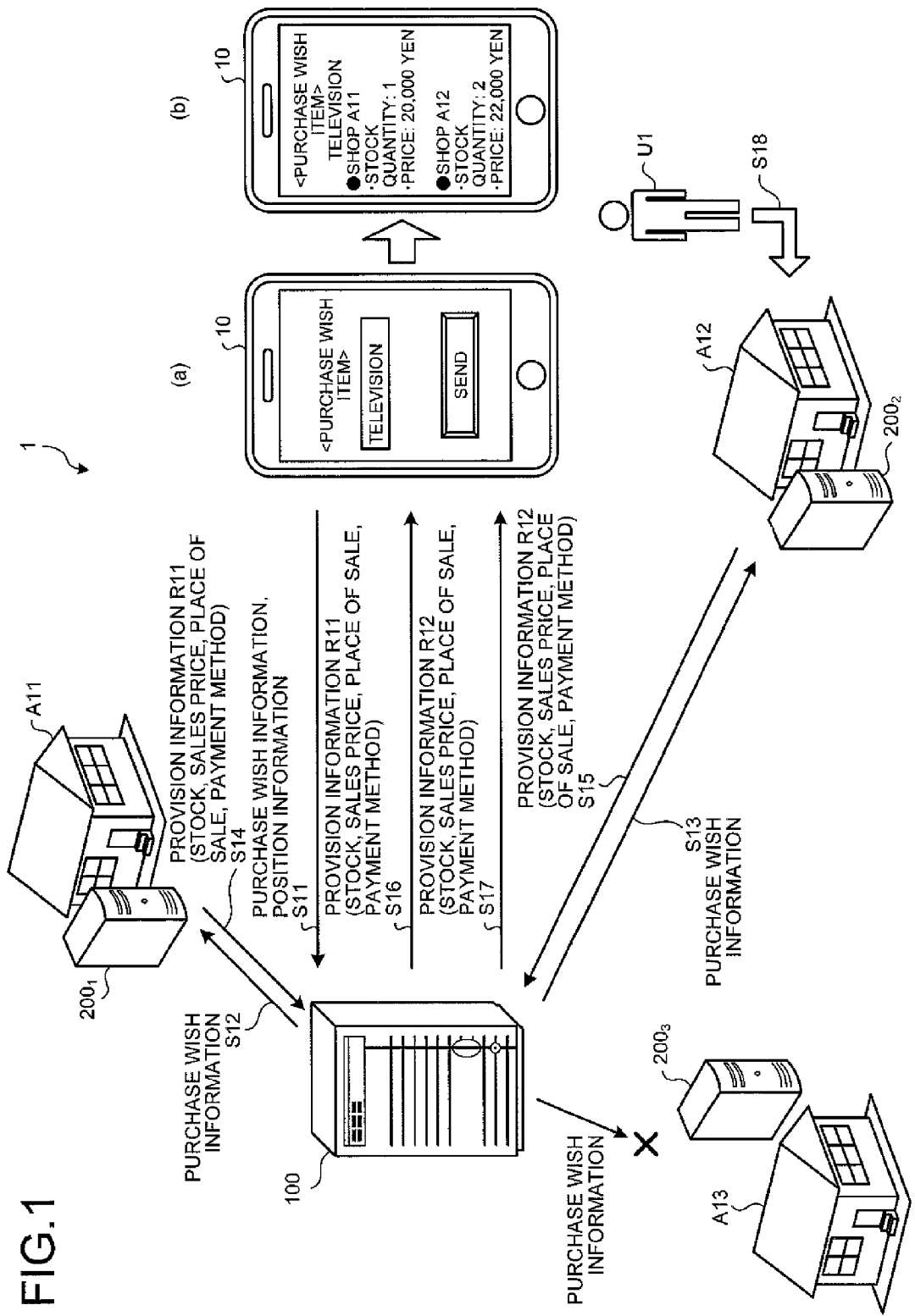
FIG. 1 is an explanatory diagram illustrating an example of an information providing process according to a first embodiment.

Hereinafter, modes (hereinafter referred to as "embodiments") for implementing an information providing apparatus, an information providing method, an information providing program, and a user device according to the present application will be described in detail with reference to the drawings. The information providing apparatus, the information providing method, the information providing program, and the user device according to the present application are not limited to these embodiments. In the respective embodiments, the same constituent components will be denoted by the same reference numerals, and redundant description thereof will not be provided.

First Embodiment 1-1. Information Providing Process

First, an example of an information providing process according to the first embodiment will be described with reference to FIG. 1. FIG. 1 is an explanatory diagram illustrating an example of the information providing process according to the first embodiment. In the example of FIG. 1, an information providing system 1 performs the information providing process. As illustrated in FIG. 1, the information providing system 1 includes a user device 10, an information providing apparatus 100, and provider devices $200_1$ to $200_3$.

The user device 10 is an information processing device used by a user U1, and for example, is a mobile terminal such as a smartphone or a personal digital assistant (PDA), a desktop personal computer (PC), a tablet PC, or a notebook PC. FIG. 1 illustrates an example in which the user device 10 is a mobile terminal such as a smartphone.

The information providing apparatus 100 is a server device that provides various types of information to the user device 10 and communicates with the user device 10 and the provider devices $200_1$ to $200_3$ by cable or radio via a network (not illustrated) (for example, the Internet network).

The provider devices $200_1$ to $200_3$ are server devices used by a service provider that provides various services in an existing facility (for example, a shop, an event venue, a public office, or the like). For example, the service provider sells items in a shop, provides a dish in a restaurant, provides a service (for example, a haircut) related to hair-dressing in a barber's shop, and provides a service which receives legal consultation in an office. In the following embodiment, an example in which the service provider sells an "item" in a "shop" which is an example of a service providing place will be described. In the example illustrated in FIG. 1, the provider device $200_1$ is used by a service provider that sells an item at a shop A11, the provider device $200_2$ is used by a service provider that sells an item at a shop A12, and the provider device $200_3$ is used by a service provider that sells an item at a shop A13.

In such the information providing system 1, the information providing apparatus 100 provides a service that suggests a shop (any one of the shops A11 to A13) at which the user U1 is practically highly likely to purchase an item to the user U1 who wishes to purchase an item. This will be described with reference to FIG. 1.

First, as illustrated in (a) of FIG. 1, the user device 10 receives, from the user U1, the input of information (hereinafter sometimes referred to as "purchase wish information") on an item that the user U1 wishes to purchase. In this example, it is assumed that the user device 10 receives the input of "television" as the purchase wish information. In this case, the user device 10 transmits the purchase wish information "television" and the present location of the user device 10 to the information providing apparatus 100 (step S11).

Subsequently, upon receiving the purchase wish information and the position information from the user device 10, the information providing apparatus 100 specifies shops that sell a purchase wish item indicated by the purchase wish information. The information providing apparatus 100 determines for each of the specified shops whether a moving cost required for moving from the present location of the user U1 indicated by the position information received from the user device 10 satisfies a predetermined condition. For example, the information providing apparatus 100 calculates a transportation cost, a travel time, or a travel labor based on a moving method as a moving cost and determines whether the calculated moving cost is a predetermined threshold value or smaller.

In the example of FIG. 1, the information providing apparatus 100 determines that the moving cost required for moving from the present location of the user U1 to the shops A11 and A1t among the shops A11 to A13 that sell the purchase wish item "television" satisfies the predetermined condition and determines that the moving cost required for moving from the present location of the user U1 to the shop A13 does not satisfy the predetermined condition. In this case, the information providing apparatus 100 transmits the purchase wish information received in step S11 to the provider device $200_1$ of the shop A11 and the provider device $200_2$ of the shop A12 (steps S12 and S13). On the other hand, the information providing apparatus 100 does not transmit the purchase wish information to the provider device $200_3$ of the shop A13 in which the moving cost does not satisfy the predetermined condition.

Subsequently, in response to reception of the purchase wish information from the information providing apparatus 100, the provider device $200_1$ of the shop A11 transmits provision information R11 related to provision of an item indicated by the purchase wish information to the information providing apparatus 100 (step S14). For example, the provider device $200_1$ transmits a stock quantity, a sales price, a place of sale, a payment method, or the like of the purchase wish item as the provision information R11 to the information providing apparatus 100. Similarly, upon receiving the purchase wish information from the information providing apparatus 100, the provider device $200_2$ of the shop A12 transmits provision information R12 of the purchase wish information to the information providing apparatus 100 (step S15).

Subsequently, the information providing apparatus 100 transmits the provision information R11 received from the provider device $200_1$ to the user device 10 (step S16) and notifies the user device 10 of the provision information R12 received from the provider device $200_2$ (step S17).

As illustrated in (b) of FIG. 1, the user device 10 displays the pieces of provision information R11 and R12 received from the information providing apparatus 100. In this example, the user device 10 displays a stock quantity "1" and a sales price "20,000 yen" as the provision information R11 of the shop A11 and displays a stock quantity "2" and a sales price "22,000 yen" as the provision information R12 of the shop A12. Although not illustrated in (b) of FIG. 1, the user device 10 also displays a place of sale and a payment method included in the respective pieces of provision information R11 and R12. FIG. 1 illustrates an example in which the user U1 visits the shop A12 corresponding to the provision information R12 by comparing the pieces of provision information R11 and R12 (step S18).

In the information providing system 1 according to the first embodiment, the information providing apparatus 100 transmits the purchase wish information only to the shops A11 and A12 in which the moving cost such as a transportation cost, a travel time, or a travel labor satisfies a predetermined condition and notifies the user device 10 of the provision information received from the shop. In this manner, the information providing apparatus 100 according to the first embodiment can provide information relevant to the shop at which the user can practically purchase an item to the user device 10. For example, when purchase wish information is received from the user U1 who wishes to purchase an item while being out of home, the information providing apparatus 100 can provide provision information of a shop in which the moving cost such as a transportation cost or a travel time is low to the user device 10 rather than simply providing the provision information of a shop of which the straight line distance from the present location of the user U1 is short. As a result, the information providing apparatus 100 can improve the possibility of the user to purchase an item and contribute not only to improvement in services to the user U1 but also to profit of the shop.

In the example of FIG. 1, the purchase wish information is transmitted to the shops A11 and A12 (the provider devices $200_1$ and $200_2$) in which the moving cost satisfies the predetermined condition. However, the information providing apparatus 100 may transmit the purchase wish information to the shops A11 to A13, which will be described in detail later. In this case, the information providing apparatus 100 provides the user device 10 with only the provision information in which the moving cost satisfies the predetermined condition among the respective pieces of provision information received from the shops A11 to A13. Even when the information is processed in this manner, the information providing apparatus 100 can provide the information relevant to the shop at which the user can practically purchase an item.

Although FIG. 1 illustrates an example in which the information providing system 1 includes one user device 10, one information providing apparatus 100, and three provider devices $200_1$ to $200_3$, the information providing system 1 may include a plurality of user devices 10 and a plurality of information providing apparatuses 100. Moreover, the information providing system 1 may include two or smaller provider devices and four or more provider devices.

Hereinafter, the user device 10, the information providing apparatus 100, and the provider devices $200_1$ to $200_3$ that implement such an information providing process will be described in detail. Since the provider devices $200_1$ to $200_3$ have the same function, these provider devices will be sometimes referred to as a "provider device 200" when it is not necessary to distinguish the provider devices $200_1$ to $200_3$.

1-2. Configuration of Information Providing Apparatus

Figure 2:
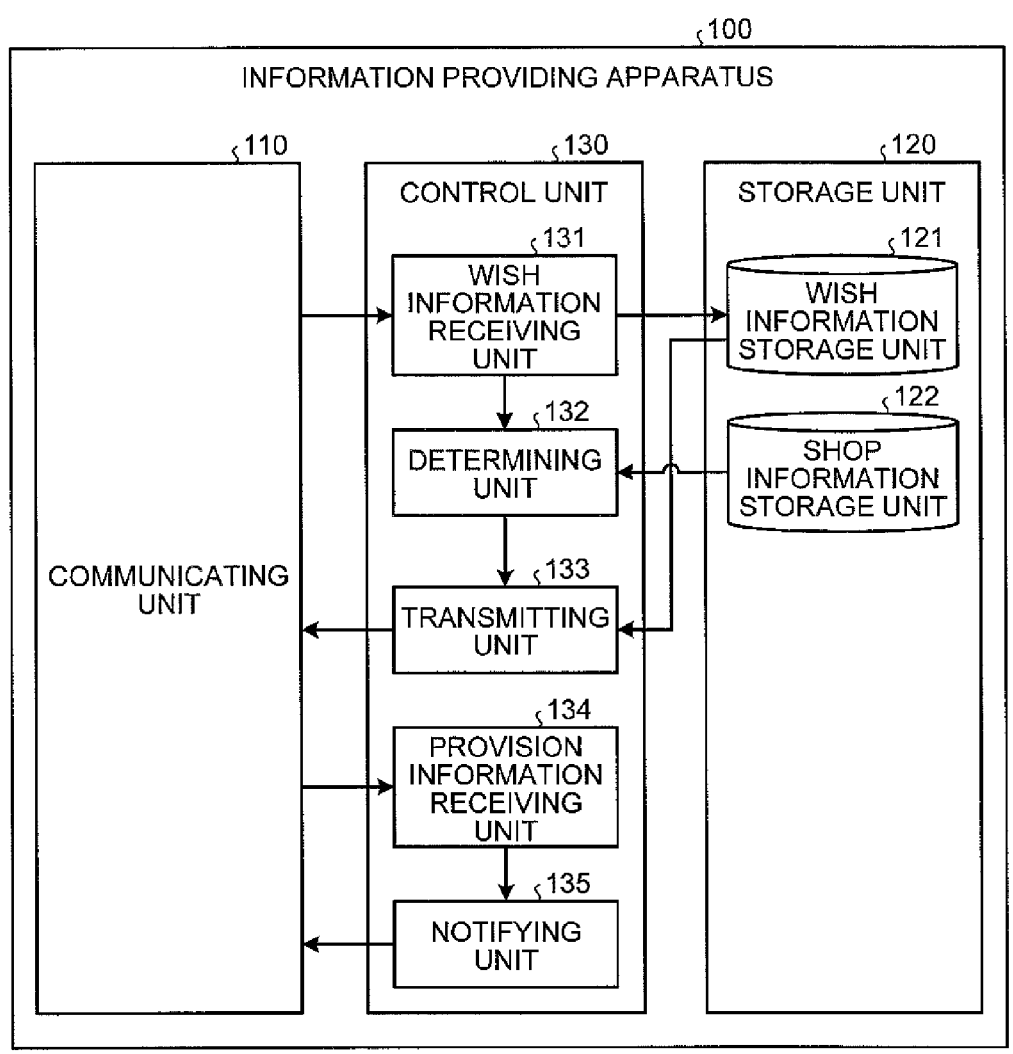
FIG. 2 is a diagram illustrating a configuration example of the information providing apparatus according to the first embodiment.

Next, the configuration of the information providing apparatus 100 according to the first embodiment will be described with reference to FIG. 2. FIG. 2 is a diagram illustrating a configuration example of the information providing apparatus 100 according to the first embodiment. As illustrated in FIG. 2, the information providing apparatus 100 includes a communicating unit 110, a storage unit 120, and a control unit 130. The information providing apparatus 100 may include an input unit (for example, a keyboard, a mouse) that receives various operations from a supervisor who uses the information providing apparatus 100 and a display unit (a liquid crystal display or the like) for displaying various types of information.

Communicating Unit 110

The communicating unit 110 is realized by a network interface card (NIC) or the like, for example. The communicating unit 110 is connected to a network by cable or radio and transmits and receives information to and from the user device 10 and the provider device 200 via the network.

Storage Unit 120

The storage unit 120 is realized, for example, by a semiconductor memory device such as a random access memory (RAM) or a flash memory, or a storage device such as a hard disk or an optical disc. As illustrated in FIG. 2, the storage unit 120 includes a wish information storage unit 121 and a shop information storage unit 122.

Wish Information Storage Unit 121

Figure 3:
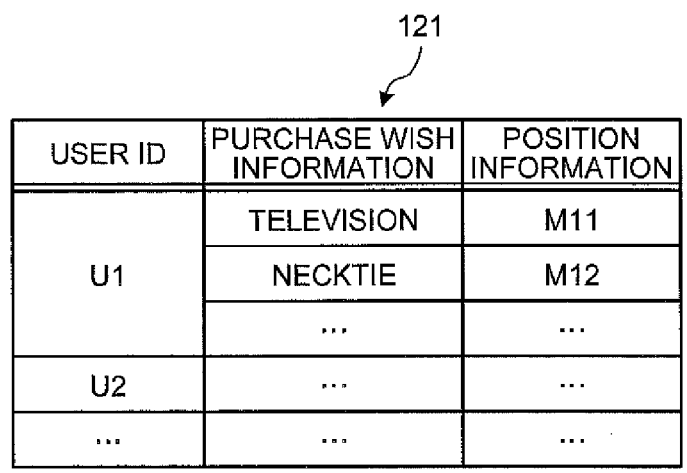
FIG. 3 is a diagram illustrating an example of a wish information storage unit according to the first embodiment.

The wish information storage unit 121 stores the purchase wish information and the like received from the user device 10. Here, FIG. 3 illustrates an example of the wish information storage unit. 121 according to the first embodiment. In the example illustrated in FIG. 3, the wish information storage unit 121 includes items such as "user ID," "purchase wish information," and "position information."

The "user ID" indicates an identifier for identifying the user of the user device 10. The user ID is transmitted from the user device 10 together with the purchase wish information and the position information. Alternatively, when hypertext transfer protocol (HTTP) cookies or the like are transmitted and received between the information providing apparatus 100 and the user device 10, the user ID may be set in the HTTP.

The "purchase wish information" indicates the purchase wish information received from the user device 10 and corresponds to the name or the like of an item that the user wishes to purchase. The "position information" indicates the position information received from the user device 10.

That is, FIG. 3 illustrates an example in which the user identified by the user ID "U1" wishes to purchase a "television" and is located at the position indicated by the position information "M11." Moreover, FIG. 3 illustrates an example in which the user identified by the user ID "U1" wishes to purchase a "necktie" and is located at the position indicated by the position information "M12." In this manner, the wish information storage unit 121 can store a plurality of combinations of the purchase wish item and the position information for the same user. In other words, the user device 10 can transmit different purchase wish items to the information providing apparatus 100.

FIG. 3 illustrates an example in which a "generic name of item" in order to simplify the description. However, the purchase wish information transmitted from the user device 10 may be an item name including an official name, a model name, a model number, or the like for identifying an item. In this case, the item name including a model name, a model number, or the like is stored in the purchase wish information of the wish information storage unit 121. Moreover, although FIG. 3 illustrates an example in which simplified information (M11 or the like) is stored in the position information, an altitude and a latitude, for example, may be stored in the position information.

Shop Information Storage Unit 122

Figure 4:
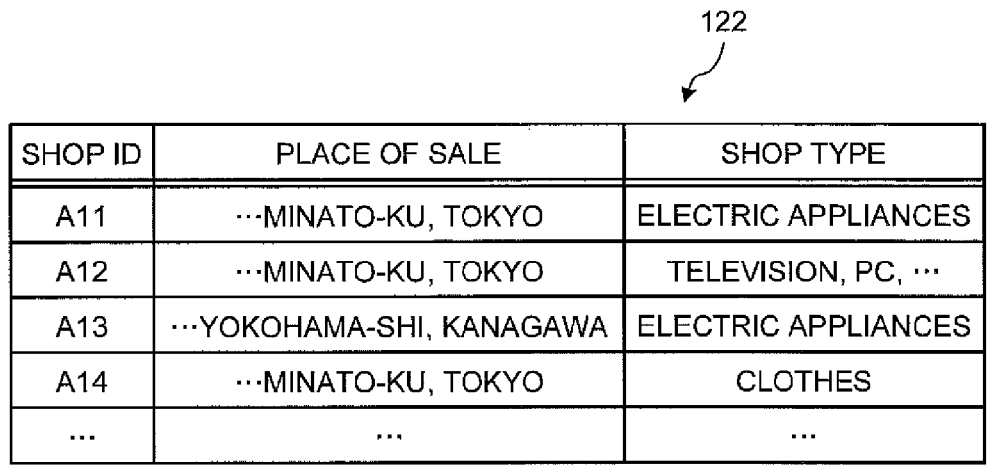
FIG. 4 is a diagram illustrating an example of a shop information storage unit according to the first embodiment.

The shop information storage unit 122 stores various types of information relevant to a shop. Here, FIG. 4 illustrates an example of the shop information storage unit 122 according to the first embodiment. In the example illustrated in FIG. 4, the shop information storage unit 122 includes items such as "shop ID," "place of sale," and "shop type."

The "shop ID" indicates an identifier for identifying a shop at which an item is sold by a service provider. The "place of sale" indicates the location of a shop indicated by the shop ID and corresponds to a place where an item is sold. The "shop type" indicates the type of items sold at a shop indicated by the shop ID. That is, FIG. 4 illustrates an example in which the shop identified by the shop ID "A11" is located at "Minato-ku, Tokyo" and electric appliances are sold at the shop.

It is assumed that various types of information illustrated in FIG. 4 are stored in advance in the shop information storage unit 122. For example, the information providing apparatus 100 updates the shop information storage unit 122 by acquiring the place of sale, the shop type, and the like from the provider device 200. In this case, the provider device 200 (that is, the shop) may request the information providing apparatus 100 to register the place of sale and the shop type in the shop information storage unit 122 by transmitting the place of sale and the shop type to the information providing apparatus 100. In this case, the shop may pay a registration fee to a supervisor (administrator) or the like who supervises the information providing apparatus 100. In this way, the supervisor (administrator) or the like who supervises the information providing apparatus 100 can obtain an advertisement charge from a shop as a reward for the service of transmitting the provision information to the user device 10. Moreover, the shop may pay a reward to the supervisor (administrator) or the like who supervises the information providing apparatus 100 according to the number of times the information providing apparatus 100 transmits the provision information of the subject shop to the user device 10. The present application is not limited to this, and the shop information storage unit 122 may be updated manually by the supervisor or the like of the information providing apparatus 100.

Control Unit 130

Returning to FIG. 2, the control unit 130 is realized, for example, when a central processing unit (CPU), a microprocessing unit (MPU), or the like executes a program (an example of an information providing program) stored in an internal storage device (the storage unit 120 or the like) using a RAM as a work area. Moreover, the control unit 130 is realized, for example, by an integrated circuit such as an application specific integrated circuit (ASIC) or a field programmable gate array (FPGA).

As illustrated in FIG. 2, the control unit 130 includes a wish information receiving unit 131, a determining unit 132, a transmitting unit 133, a provision information receiving unit 134, and a notifying unit 135 and implements or executes information processing functions and operations to be described below. The internal configuration of the control unit 130 is not limited to the configuration illustrated in FIG. 2, and the control unit 130 may have a different configuration as long as it performs the information processing to be described below.

Wish Information Receiving Unit 131

The wish information receiving unit 131 receives the purchase wish information and the position information from the user device 10. In this case, the wish information receiving unit 131 also receives the user ID for identifying the user of the user device 10. The wish information receiving unit 131 stores the purchase wish information and the position information in the wish information storage unit 121 in correlation with the user ID.

Determining Unit 132

When the purchase wish information and the position information are received by the wish information receiving unit 131, the determining unit 132 determines whether the moving cost required for moving from the position indicated by the position information to the shop satisfies a predetermined condition. Specifically, the determining unit 232 specifies a shop ID and a place of sale of a shop that sells the purchase wish item indicated by the purchase wish information based on the shop type stored in the shop information storage unit 122. Subsequently, the determining unit 132 calculates the moving cost required for moving from the present location of the user indicated by the position information to the place of sale for each of the specified shop IDs. After that, the determining unit 132 determines whether the calculated moving cost satisfies a predetermined condition.

Hereinafter, an example of the moving cost calculated by the determining unit 132 will be described. For example, the determining unit 132 calculates a transportation cost required for moving from the present location of the user to the place of sale as the moving cost. An example of the transportation cost is a train fare, a taxi fare, a gasoline cost, and the like. Specifically, the determining unit 132 calculates a train fare required for moving a station near the present location of the user to a station near the place of sale by using a route retrieval service or the like provided on the Internet. Alternatively, the present application is not limited to this, and the determining unit 132 calculates the train fare based on route information stored in the information providing apparatus 100 when the information providing apparatus 100 provides the route retrieval service. Moreover, the determining unit 132 estimates, instead of the train fare, a taxi fare or a gasoline cost required for the user to drive a private car to the place of sale based on the distance from the present location of the user to the place of sale, the route of a road used from the present location of the user to the place of sale, or the like.

Moreover, for example, the determining unit 132 calculates a travel time required for traveling from the present location of the user to the place of sale as the moving cost. In this case, the determining unit 132 calculates the travel time by taking the route of a road used from the present location of the user to the place of sale or the like into consideration.

Moreover, for example, the determining unit 132 calculates a travel labor required for traveling from the present location of the user to the place of sale as the moving cost. Specifically, the determining unit 132 calculates the travel labor based on a moving method (walking, a train, or the like) used from the present location of the user to the place of sale. As an example, the determining unit 132 determines that the travel labor when the moving method is walking is larger than the travel labor when the moving method is a train and calculates the moving cost for walking to be higher than the other. Moreover, for example, the determining unit 132 determines that the travel labor when the moving method involves a train transfer is larger than when the moving method does not involve a train transfer and calculates the moving cost for the train transfer to be higher than the other.

In this manner, the determining unit 132 calculates at least one of the transportation cost, the travel time, and the travel labor as the moving cost. Alternatively, the determining unit 132 may calculate all of the transportation cost, the travel time, and the travel labor as the moving cost. In this case, the determining unit 132 digitizes the transportation cost, the travel time, and the travel labor to a number (for example, a normalized value between "0" and "1") and calculates the moving cost by adding or multiplying the respective numbers.

Here, an example of the process of the determining unit 132 will be described. It is assumed that the wish information receiving unit 131 receives the purchase wish information "television" and the position information "M11" corresponding to the user ID "U1" illustrated in FIG. 3. Moreover, it is assumed that the shop information storage unit 122 stores various types of information illustrated in FIG. 4. In this case, the determining unit 132 specifies the shop ID of a shop that sells the purchase wish information "television" from the shop information storage unit 122. In this example, it is assumed that the determining unit 132 specifies the shop IDs "A11" to "A13." Subsequently, the determining unit 132 calculates the moving cost required for moving from the position information "M11" to the place of sale with respect to each of the shop IDs "A11" to "A13" and determines whether the calculated moving cost satisfies a predetermined condition. In this example, it is assumed that the position information "M11" indicates "Minato-ku, Tokyo." In this case, for example, the determining unit 132 determines that the moving costs corresponding to the shop IDs "A11" and "A12" satisfies the predetermined condition and determines that the moving cost corresponding to the shop ID "A13" does not satisfy the predetermined condition.

Transmitting Unit 133

The transmitting unit 133 transmits the purchase wish information received by the wish information receiving unit 131 to the provider device 200. Specifically, the transmitting unit 133 transmits the purchase wish information stored in the wish information storage unit 121 to the provider device 200 used by the shop (service provider) in which the determining unit 132 determines that the moving cost satisfies the predetermined condition.

For example, similarly to the above example, it is assumed that the determining unit 132 determines that the moving costs of the shop IDs "A11" and "A12" satisfy the predetermined condition. In this case, the transmitting unit 133 transmits the purchase wish information to the provider device 200 of the shop indicated by the shop ID "A11" and transmits the purchase wish information to the provider device 200 of the shop indicated by the shop ID "A12." The information providing apparatus 100 stores in advance the information (IP addresses and the like) for identifying the provider device 200 corresponding to the shop ID and transmits the purchase wish information to the provider device 200 based on these pieces of information.

Provision Information Receiving Unit 134

The provision information receiving unit 134 receives the provision information related, to provision of the purchase wish item of the user from the provider device 200 having received the purchase wish information transmitted by the transmitting unit 133. For example, the provision information receiving unit 134 receives a stock quantity, a sales price, a place of sale, a payment method, and the like of the purchase wish item from the provider device 200 as the provision information.

Notifying Unit 135

The notifying unit 135 notifies the user device 10 of the provision information received by the provision information receiving unit 134. In the first embodiment, the transmitting unit 133 transmits the purchase wish information to the provider device 200 of the shop (the service provider) in which the determining unit 132 determines that the moving cost satisfies the predetermined condition, and the provision information receiving unit 134 receives the provision information as a response from the provider device 200 having received the purchase wish information. Thus, the notifying unit 135 according to the first embodiment notifies the user device 10 of the provision information obtained from the shop (the service provider) in which the determining unit 132 determines that the moving cost satisfies the predetermined condition. The notifying unit 135 notifies the user device 10 of the shop ID and the shop name as well as the provision information received from the provider device 200.

The notifying unit 135 may notify the user device 10 of the provision information in the order of being received by the provision information receiving unit 134 and may notify the user device 10 of the provision information received by the provision information receiving unit 134 for a predetermined period at a time. Moreover, the notifying unit 135 may notify the user device 10 of the provision information in a predetermined period only. For example, the notifying unit 135 notifies the user device 10 of the provision information received for a predetermined period (for example, one hour, one day, or one week) after a provision information request is received from the user device 10.

1-3. Configuration of Provider Device

Figures 5, 6:
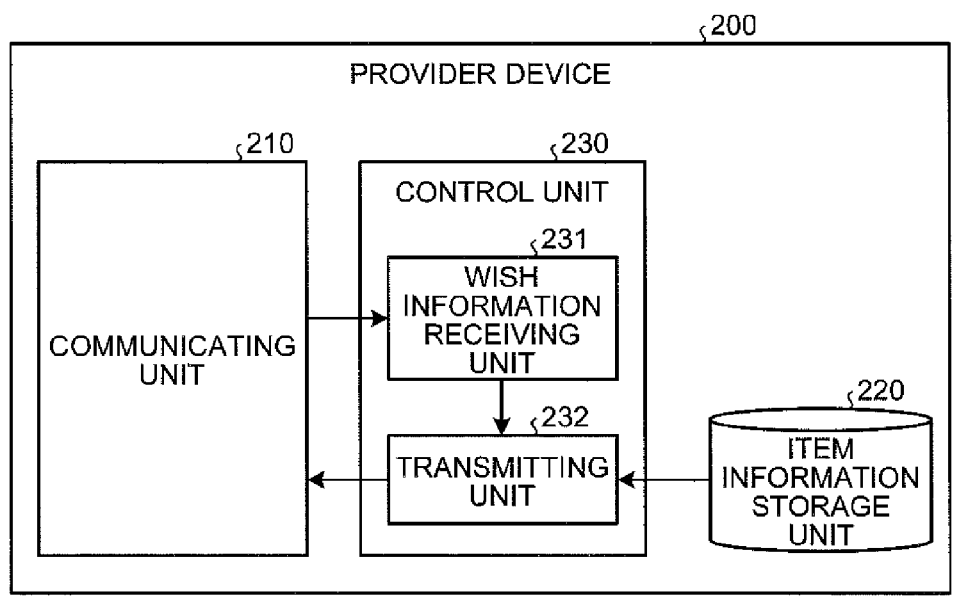
FIG. 5 is a diagram illustrating a configuration example of a provider device according to the first embodiment.
FIG. 6 is a diagram illustrating an example of an item information storage unit according to the first embodiment.

Next, the configuration of the provider device 200 according to the first embodiment will be described with reference to FIG. 5. FIG. 5 is a diagram illustrating a configuration example of the provider device 200 according to the first embodiment. As illustrated in FIG. 5, the provider device 200 includes a communicating unit 210, an item information storage unit 220, and a control unit 230. The provider device 200 may include an input unit (for example, a keyboard or a mouse) that receives various operations from a supervisor or the like who uses the provider device 200 and a display unit (a liquid crystal display or the like) for displaying various types of information.

Communicating Unit 210

The communicating unit 210 is realized by an NIC or the like, for example. The communicating unit 210 is connected to a network by cable or radio and transmits and receives information to and from the information providing apparatus 100.

Item Information Storage Unit 220

The item information storage unit 220 is realized, for example, by a semiconductor memory device such as a RAM or a flash memory, or a storage device such as a hard disk or an optical disc. The item information storage unit 220 stores various types of information related to items sold at a shop. Here, FIG. 6 illustrates an example of the item information storage unit 220 according to the first embodiment. In the example illustrated in FIG. 6, the item information storage unit 220 includes items such as "item ID," "item name," "stock quantity," and "sales price."

The "item ID" indicates an identifier for identifying an item sold at a shop and an item that can be sold at a shop. The "item name" indicates the name of an item indicated by the item ID. The "stock quantity" indicates a stock quantity in a shop of the item indicated by the item ID. The "sales price" indicates a sales price in a shop of the item indicated by the item ID.

That is, FIG. 6 illustrates an example in which the item name of an item identified by the item ID "C1" is "television" and the stock quantity of the item is "1," and the item is sold at "20,000 yen."

Control Unit 230

Returning to FIG. 5, the control unit 230 is realized, for example, when a CPU, an MPU, or the like executes a program (an example of a provision information transmission program) stored in an internal storage device using a RAM as a work area. Moreover, the control unit 230 is realized, for example, by an integrated circuit such as an ASIC or an FPGA.

As illustrated in FIG. 5, the control unit 230 includes a wish information receiving unit 231 and a transmitting unit 232 and implements or executes information processing functions and operations to be described below. The internal configuration of the control unit 230 is not limited to the configuration illustrated in FIG. 5, and the control unit 230 may have a different configuration as long as it performs the information processing to be described below.

Wish Information Receiving Unit 231

The wish information receiving unit 231 receives the purchase wish information transmitted by the transmitting unit 133 of the information providing apparatus 100.

Transmitting Unit 232

When the purchase wish information is received by the wish information receiving unit 231, the transmitting unit 232 transmits the provision information corresponding to the purchase wish information to the information providing apparatus 100. Specifically, the transmitting unit 232 acquires the "stock quantity," the "sales price," and the like corresponding to the item indicated by the purchase wish information from the item information storage unit 220 and transmits the provision information including the acquired "stock quantity" and "sales price" to the information providing apparatus 100.

The transmitting unit 232 may also include the information relevant to a place of sale (that is, the location of a shop) of the item indicated by the purchase wish information and a payment method (cash, credit card, or the like) used for purchasing the item to the provision information. Moreover, when the payment method is different for each item, the item information storage unit 220 may store information relevant to the payment method for each item ID, and the transmitting unit 232 may transmit the information relevant to the payment method stored in the item information storage unit 220 to the information providing apparatus 100.

1-4. Configuration of User Device

Figure 7:
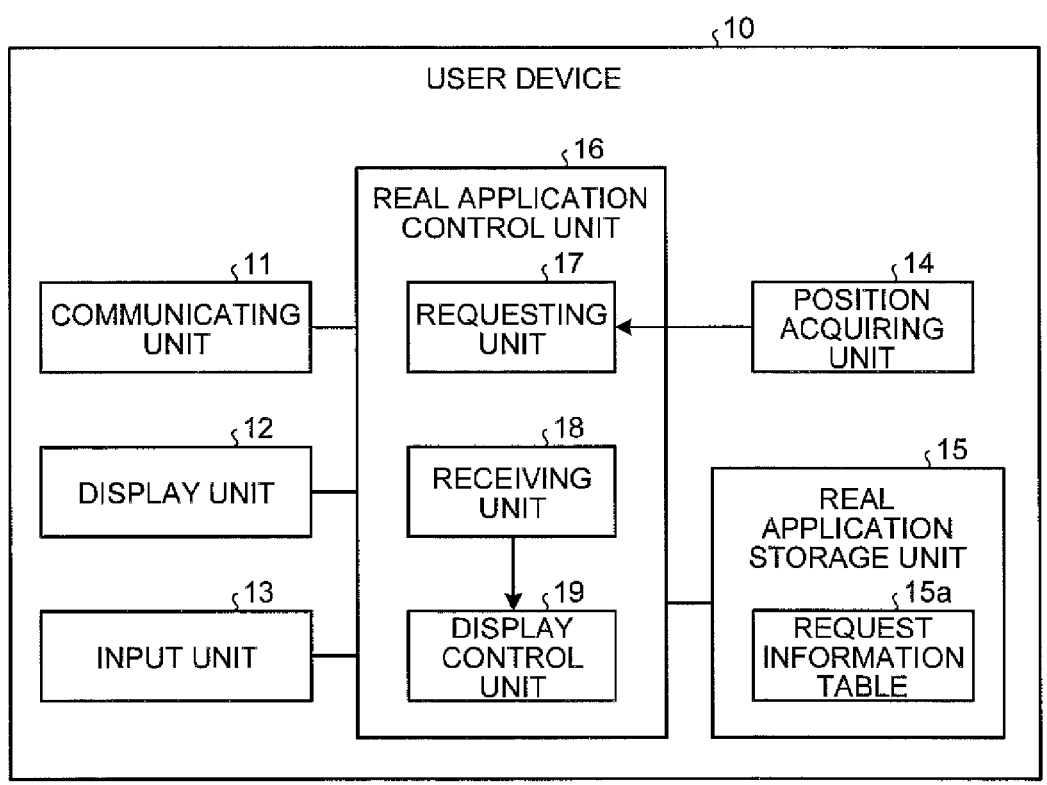
FIG. 7 is a diagram illustrating a configuration example of a user device according to the first embodiment.

Next, the configuration of the user device 10 according to the first embodiment will be described with reference to FIG. 7. FIG. 7 is a diagram illustrating a configuration example of the user device 10 according to the first embodiment. As illustrated in FIG. 7, the user device 10 includes a communicating unit 11, a display unit 12, an input unit 13, a position acquiring unit 14, a real application storage unit 15, and a real application control unit 16.

Communicating Unit 11

The communicating unit 11 is connected to a network by cable or radio and transmits and receives information to and from the information providing apparatus 100.

Display Unit 12 and Input Unit 13

The display unit 12 is a display device for displaying various types of information. For example, the display unit 12 is realized by a liquid crystal display. The input unit 13 is an input device that receives various operations from the user. When a touch panel is employed in the user device 10, the display unit 12 and the input unit 13 are integrated.

Position Acquiring Unit 14

The position acquiring unit 14 acquires the position information relevant to the location of the user device 10. Specifically, the position acquiring unit 14 has a global positioning system (GPS) receiving function and acquires the position information (for example, altitude and latitude) of the user device 10 based on radio waves transmitted from GPS satellites.

Real Application. Storage Unit 15

The real application storage unit 15 stores an application (an example of a provision information display program; hereinafter sometimes referred to as a "real application") that implements a process of transmitting the purchase wish information and the position information to the information providing apparatus 100, a process of receiving the provision information from the information providing apparatus 100, a process of displaying the provision information received from the information providing apparatus 100 on the display unit 12, and other processes. Such a real application is provided by the information providing apparatus 100, for example. In this case, the user device 10 downloads the real application from the information providing apparatus 100 or the like and stores the same in the real application storage unit 15.

Moreover, the real application storage unit 15 includes a request information table 15a as illustrated in FIG. 7. The request information table 15a stores the purchase wish information that the user device 10 transmits to the information providing apparatus 100 and the provision information received from the information providing apparatus 100.

Here, FIG. 8 illustrates an example of the request information table 15a according to the first embodiment. In the example illustrated in FIG. 8, the request information table 15a includes items such as "request ID," "purchase wish item," and "provision information."

The "request ID" indicates an identifier for identifying a request (a provision information request to be described below) for provision information that the user device 10 transmits to the information providing apparatus 100. The "purchase wish item" indicates purchase wish information that the user device 10 transmits to the information providing apparatus 100. The "provision information" indicates provision information notified by the notifying unit 135 of the information providing apparatus 100 and corresponds to the information such as a shop ID, a stock quantity, a sales price, a place of sale, and a payment method. Although FIG. 8 illustrates an example in which the "shop ID" within the provision information is included, the provision information may include the "shop name" instead of the "shop ID." In this case, the information providing apparatus 100 transmits the "shop name" to the user device 10.

Real Application Control Unit 16

The real application control unit 16 is realized, for example, when a CPU, an MPU, or the like executes the real application stored in the real application storage unit 15 using a RAM as a work area. As illustrated in FIG. 7, the real application control unit 16 includes a requesting unit 17, a receiving unit 18, and a display control unit 19 and implements or executes the information processing functions and operations to be described below. The internal configuration of the real application control unit 16 is not limited to the configuration illustrated in FIG. 7, and the real application control unit 16 may have a different configuration as long as it performs the information processing to be described below.

Requesting Unit 17

The requesting unit 17 transmits the purchase wish information input by the user and the position information indicating the present location of the user device 10 acquired by the position acquiring unit 14 to the information providing apparatus 100. Specifically, the requesting unit 17 transmits the provision information request including the purchase wish information and the position information to the information providing apparatus 100 in order to request the information providing apparatus 100 to transmit the provision information. The requesting unit 17 stores a request ID for identifying the provision information request transmitted to the information providing apparatus 100 and the purchase wish information transmitted to the information providing apparatus 100 in the request information table 15a. At this point in time, various types of information are not stored in the provision information of the request information table 15a corresponding to the request ID.

Receiving Unit 18

The receiving unit 18 receives the provision information of the respective shops from the information providing apparatus 100 having received the purchase wish information and the position information transmitted from the requesting unit 17. Specifically, the receiving unit 18 receives the provision information from the information providing apparatus 100 as a response to the provision information request transmitted by the requesting unit 17. Moreover, the receiving unit 18 stores the provision information responded by the information providing apparatus 100 in the request information table 15a in correlation with the request ID of the provision information request.

Display Control Unit 19

The display control unit 19 controls the display unit 12 to display the provision information received by the receiving unit 18. Specifically, the display control unit 19 controls the display unit 12 to display the provision information stored in the request information table 15a according to a user operation. The display control unit 19 may control the provision information to be automatically displayed at the point in time when the provision information is received by the receiving unit 18.

Screen Example of User Device 10

Figure 9A:
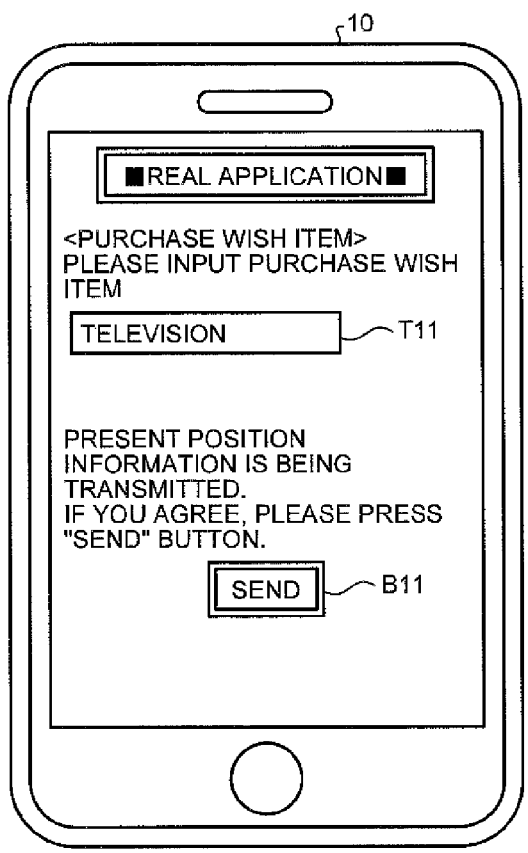
FIGS. 9A and 9B are diagrams illustrating an example of a screen displayed on a real application control unit according to the first embodiment.
Figure 9B:
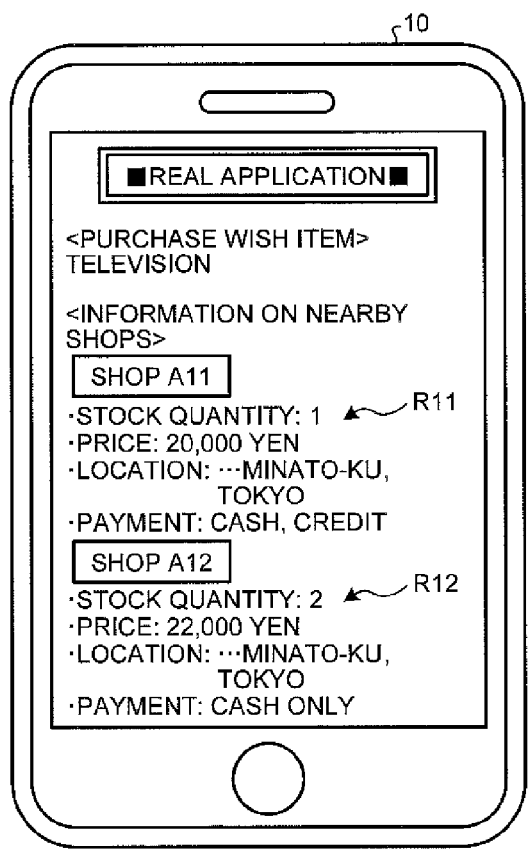

Here, the process of the real application control unit 16 will be described with reference to FIGS. 9A and 9B. FIGS. 9A and 9B are diagrams illustrating an example of a screen displayed on the real application control unit 16 according to the first embodiment.

The requesting unit 17 of the real application control unit 16 displays a request input screen illustrated in FIG. 9A on the display unit 12 when the user inputs an operation to activate the real application. The request input screen includes a wish item input field T11 for inputting a purchase wish item and a send button B11 for transmitting the provision information request to the information providing apparatus 100. FIG. 9A illustrates an example in which the user inputs "television" in the wish item input field T11. In this state, when the send button B11 is pressed, the requesting unit 17 transmits the provision information request including the purchase wish information "television" input in the wish item input field T11 and the position information acquired by the position acquiring unit 14 to the information providing apparatus 100.

After that, when the receiving unit 18 receives the provision information from the information providing apparatus 100, the display control unit 19 controls the display unit 12 to display the provision information screen illustrated in FIG. 9B. In the example of FIG. 9B, it is assumed that the provision information corresponding to the request ID "Q1" illustrated in FIG. 8 is displayed. That is, the display control unit 19 controls the display unit 12 to display the provision information screen including the provision information R11 of the shop A11 and the provision information R12 of the shop A12 as the provision information corresponding to the purchase wish item "television."

In this manner, the user of the user device 10 can view the provision information of the items of a shop in which the moving cost required for moving from the present location satisfies a predetermined condition only by inputting the purchase wish item in the request input screen (FIG. 9A). That is, the user of the user device 10 can view the provision information of the items of a shop at which the user can practically purchase an item.

1-5. Flow of Processes of Information Providing System

Figure 10:
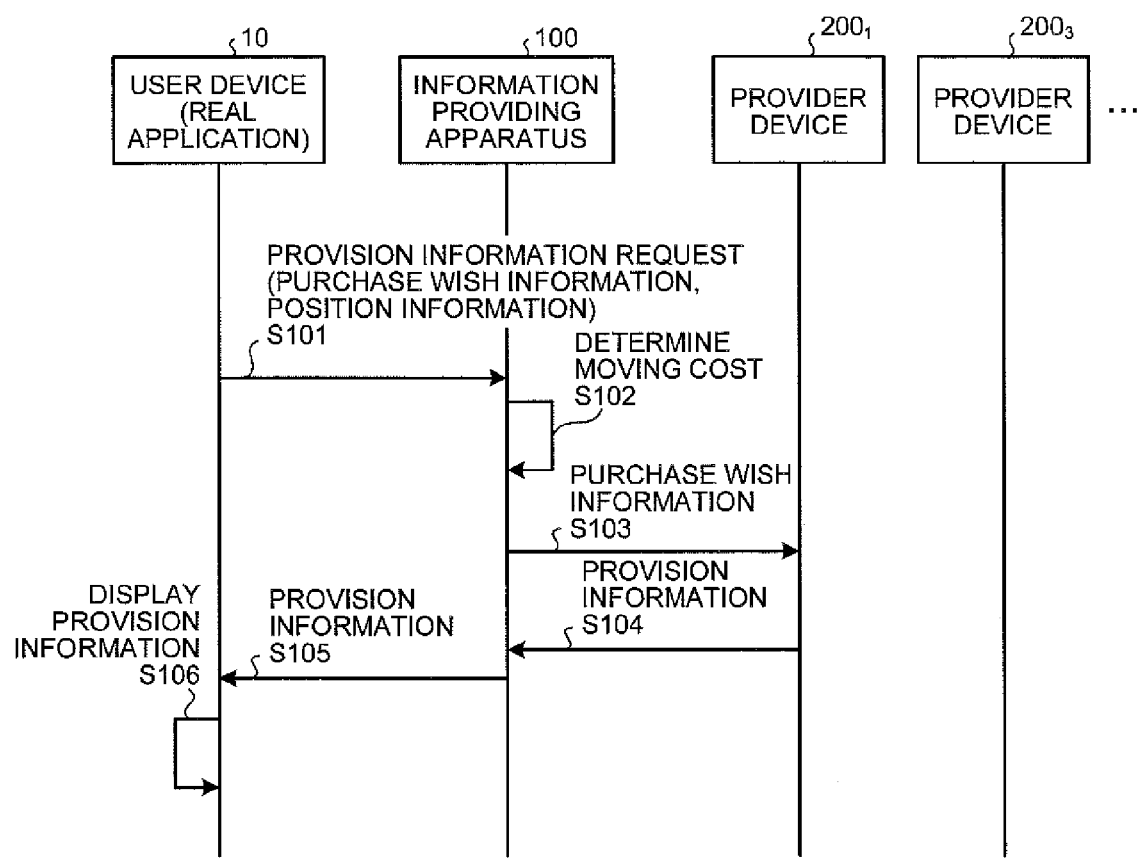
FIG. 10 is a sequence diagram illustrating the flow of processes of the information providing system according to the first embodiment.

Next, the flow of processes of the information providing system 1 according to the first embodiment will be described with reference to FIG. 10. FIG. 10 is a sequence diagram illustrating the flow of processes of the information providing system 1 according to the first embodiment. In FIG. 10, the provider devices $200_1$ and $200_3$ illustrated in FIG. 1 are taken as an example.

As illustrated in FIG. 10, the user device 10 transmits a provision information request including the purchase wish information (information indicating the purchase wish item) and the position information to the information providing apparatus 100 according to the user operation (step S101).

Subsequently, when the provision information request is received from the user device 10, the information providing apparatus 100 determines whether the moving cost of each of the shops satisfies a predetermined condition based on the purchase wish information and the position information included in the provision information request (step S102). In this example, similarly to the example illustrated in FIG. 1, the information providing apparatus 100 determines that the moving cost of the shop A11 satisfies the predetermined condition and the moving cost of the shop A13 does not satisfy the predetermined condition.

In this case, the information providing apparatus 100 transmits the purchase wish information received from the user device 10 to the provider device $200_1$ corresponding to the shop A11 (step S103). On the other hand, the information providing apparatus 100 does not transmit the purchase wish information to the provider device $200_3$ corresponding to the shop A13.

Subsequently, the information providing apparatus 100 receives the provision information from the provider device $200_1$ as a response to reception of the purchase wish information (step S104). In this case, the information providing apparatus 100 transmits the provision information received from the provider device $200_1$ to the user device (step S105). Moreover, the user device 10 controls the display unit 12 to display the provision information received from the information providing apparatus 100 (step S106).

1-6. Effects

As described above, the information providing apparatus 100 according to the first embodiment includes the wish information receiving unit 131, the determining unit 132, the transmitting unit 133, the provision information receiving unit 134, and the notifying unit 135. The wish information receiving unit 131 receives the purchase wish information (an example of wish information) on the purchase wish item (an example of wish item) that the user wishes to purchase and the position information relevant to the user from the user device 10 used by the user. The transmitting unit 133 transmits the purchase wish information received by the wish information receiving unit 131 to the provider device 200 used by the service provider (an example of a provider) who provides an item. The provision information receiving unit 134 receives the provision information related to provision of the purchase wish item from the provider device 200. The transmitting unit 133 determines whether the moving cost required for moving from the position indicated by the position information to the shop (an example of a providing place) at which the purchase wish item is provided by the service provider satisfies a predetermined condition. The notifying unit 135 notifies the user device 10 of the provision information corresponding to the service provider in which the determining unit 132 determines that the moving cost satisfies the predetermined condition.

In this way, the information providing apparatus 100 according to the first embodiment can provide the information relevant to a shop at which the user can practically purchase an item since the user device 10 is notified of the provision information corresponding to the service provider in which the moving cost satisfies the predetermined condition. As a result, the information providing apparatus 100 can improve the possibility of the user to purchase an item and contribute to improvement in services to the user and profit of the shop.

In the information providing apparatus 100 according to the first embodiment, the transmitting unit 133 transmits the purchase wish information received by the wish information receiving unit 131 to the provider device 200 of the service provider in which the determining unit 132 determines that the moving cost satisfies the predetermined condition. Moreover, the provision information receiving unit 134 receives the provision information as a response to reception of the purchase wish information transmitted by the transmitting unit 133 from the provider device 200. Moreover, the notifying unit 135 notifies the user device 10 of the provision information received by the provision information receiving unit 134 as the provision information of the service provider in which the moving cost satisfies the predetermined condition.

In this manner, the information providing apparatus 100 according to the first embodiment transmits the purchase wish information only to the provider device 200 corresponding to the service provider in which the moving cost satisfies the predetermined condition. Thus, it is possible to suppress an increase in a network load and to provide the information relevant to a shop at which the user can practically purchase an item.

In the information providing apparatus 100 according to the first embodiment, the transmitting unit 133 uses at least one of a transportation cost, a travel time, and a travel labor based on a moving method as the moving cost and determines that the moving cost satisfies the predetermined condition when the transportation cost, the travel time, or the travel labor is a predetermined threshold value or smaller.

In this manner, the information providing apparatus 100 according to the first embodiment can provide provision information of a shop in which the moving cost such as a transportation cost, a travel time, or a travel labor is low to the user device 10 rather than simply providing the provision information of a shop (a service provider) of which the straight line distance from the present location of the user is short.

Second Embodiment

In the first embodiment, an example in which the information providing apparatus 100 determines whether the moving cost satisfies the predetermined condition has been described. Here, the information providing apparatus 100 may change the predetermined condition according to the purchase wish information received from the user device 10 and determine whether the moving cost satisfies the changed predetermined condition. Thus, in the second embodiment, an example in which the predetermined condition is changed according to the purchase wish information will be described. The configuration of the information providing system 1 according to the second embodiment is the same as that illustrated in FIG. 1, and description thereof will not be provided.

2-1. Configuration of Information Providing Apparatus

Figures 11, 12:
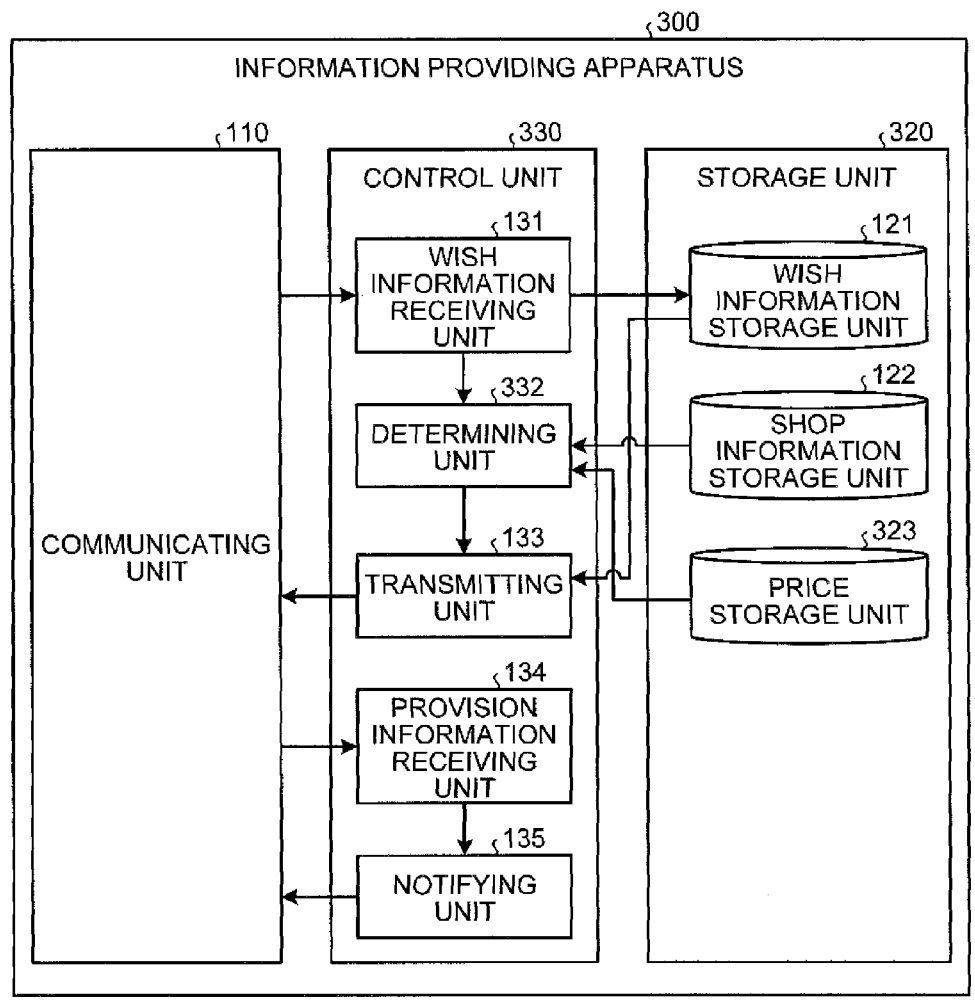
FIG. 11 is a diagram illustrating a configuration example of an information providing apparatus according to a second embodiment.
FIG. 12 is a diagram illustrating an example of a price storage unit according to the second embodiment.

First, a configuration of an information providing apparatus 300 according to the second embodiment will be described with reference to FIG. 11. FIG. 11 is a diagram illustrating a configuration example of the information providing apparatus 300 according to the second embodiment. As illustrated in FIG. 11, in the information providing apparatus 300, a price storage unit 323 is included in a storage unit 320, and a determining unit 332 is included in a control unit 330.

Price Storage Unit 323

The price storage unit 323 stores the prices of each item. Here, FIG. 12 illustrates an example of the price storage unit 323 according to the second embodiment. In the example illustrated in FIG. 12, the price storage unit 323 includes items including "item name," and "market price."

The "item name" indicates the name of an item. The "item name" may be an item name including an official name, a model name, a model number, or the like for identifying an item. The "market price" indicates a market price of an item. For example, the information providing apparatus 300 acquires the prices of an item from a plurality of provider devices 200 and stores an average value of the acquired prices in the price storage unit 323 as the market price. Moreover, for example, a supervisor or the like of the information providing apparatus 300 may manually update the price storage unit 323.

Determining Unit 332

When the purchase wish information and the position information are received by the wish information receiving unit 131, the determining unit 332 changes the predetermined condition according to the market price stored in the price storage unit 323 in correlation with the purchase wish item indicated by the purchase wish information and determines whether the moving cost satisfies the changed predetermined condition. Specifically, the determining unit 332 changes the predetermined condition such that the higher the market price of the purchase wish item, the looser the changed condition, whereas the lower the market price of the purchase wish item, the tighter the changed condition.

An example of the process of the determining unit 332 will be described. For example, a purchase wish item of which the market price is high tends to be that the difference in the sales prices of respective shops is large. That is, there is a possibility that a shop in which the moving cost (for example, the transportation cost) required for moving from the present location of the user is high sells an item at such a low price that the moving cost can be compensated for as compared to another shop in which the moving cost is low. In such a case, some user may wish to purchase an item at a shop in which the sales price is low even though the moving cost is high. Thus, the determining unit 332 according to the second embodiment broadens a range of shops (provider devices 200) serving as a transmission destination of the purchase wish information by changing the predetermined condition to a loose condition when the market price of the purchase wish item is high. In other words, the determining unit 332 acquires the provision information from a shop in which the moving cost is high as well as a shop in which the moving cost is low by changing the predetermined condition such that the higher the market price of the purchase wish item, the looser the changed condition.

On the other hand, a purchase wish item of which the market price is low has a low possibility that the difference in the sales prices of respective shops is large because the price of the item itself is low. That is, there is a low possibility that a shop in which the moving cost (for example, the transportation cost) is high sells an item at such a low price that the moving cost can be compensated for. In such a case, some user may wish to purchase an item at a shop in which the moving cost is low even though the sales price is slightly high. Thus, the determining unit 332 according to the second embodiment acquires the provision information from only a shop in which the moving cost is low by changing the predetermined condition such that the lower the market price of the purchase wish item, the stricter the changed condition.

2-2. Effects

As described above, the information providing apparatus 300 according to the second embodiment includes the price storage unit 323 and the determining unit 332. The price storage unit 323 stores the market price (an example of a price) of each item. The determining unit 332 changes the predetermined condition according to the market price stored in the price storage unit 323 in correlation with the purchase wish item and determines whether the moving cost satisfies the predetermined condition.

In this way, the information providing apparatus 300 according to the second embodiment can notify the user device 10 of the provision information of a shop that sells an item at such a price that the moving cost can be compensated for. As a result, the information providing apparatus 300 can improve the possibility of the user to purchase an item and contribute to improvement in services to the user and profit of the shop.

Third Embodiment

In addition, in the first and second embodiments, an example in which the information providing apparatus 100 notifies the user device 10 of all pieces of provision information received from the provider device 200 has been described. However, the information providing apparatus 100 may hold an auction for granting the right to sell a purchase wish item to a shop in which the moving cost satisfies the predetermined condition. Thus, in the third embodiment, an example in which the shop is granted the right to sell a purchase wish item will be described. The configuration of the information providing system 1 according to the third embodiment is the same as that illustrated in FIG. 1, and description thereof will not be provided.

3-1. Configuration of Information Providing Apparatus

Figure 13:
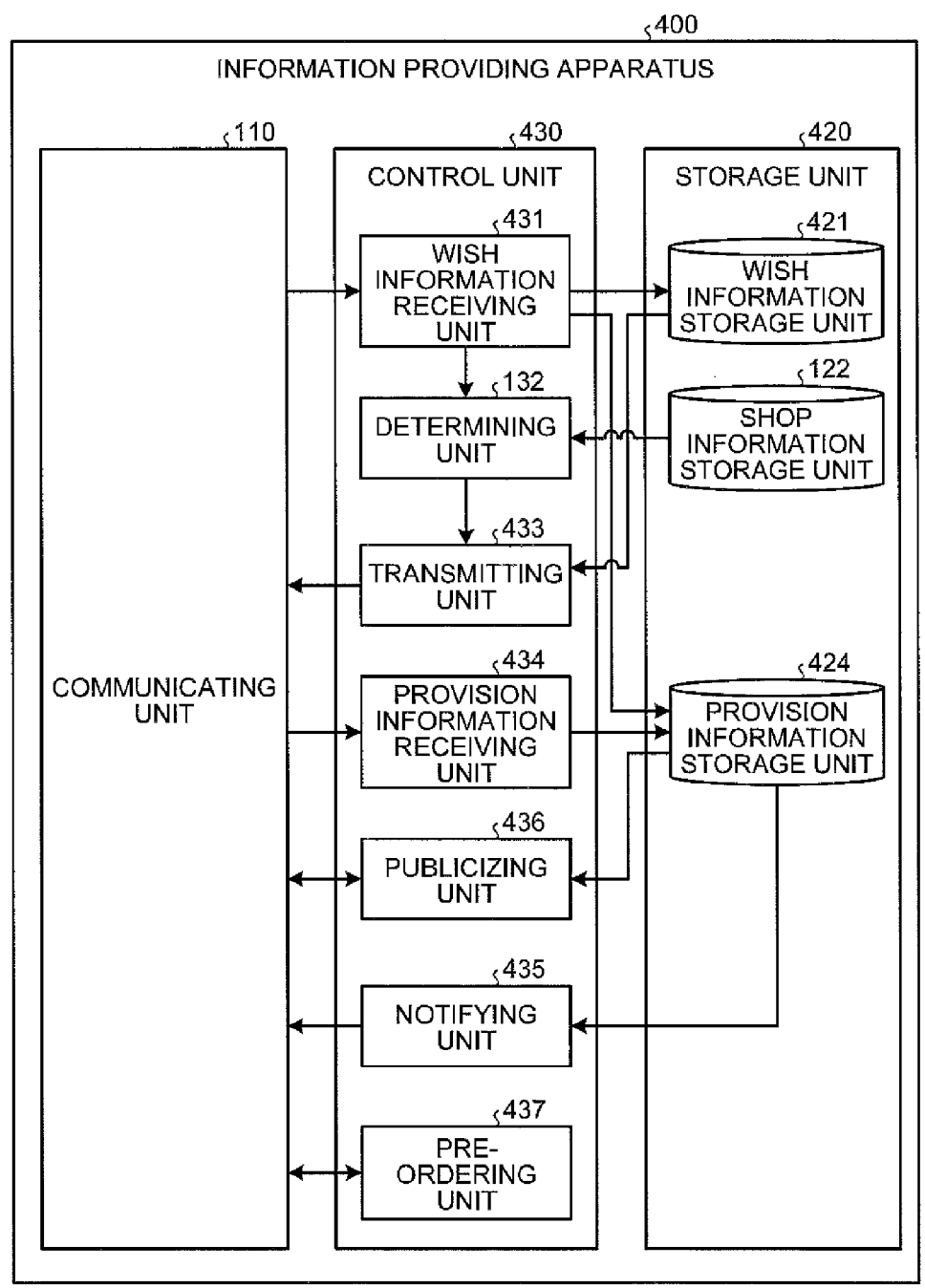
FIG. 13 is a diagram illustrating a configuration example of an information providing apparatus according to a third embodiment.

First, a configuration of an information providing apparatus 400 according to the third embodiment will be described with reference to FIG. 13. FIG. 13 is a diagram illustrating a configuration example of the information providing apparatus 400 according to the third embodiment. As illustrated in FIG. 13, the information providing apparatus 400 includes a storage unit 420 and a control unit 430. The storage unit 420 includes a wish information storage unit 421, a provision information storage unit 424, and the control unit 430 includes a wish information receiving unit 431, a transmitting unit 433, a provision information receiving unit 434, a notifying unit 435, a publicizing unit 436, and a pre-ordering unit 437.

Wish Information Storage Unit 421

FIG. 14 illustrates an example of the wish information storage unit 421 according to the third embodiment. In the example illustrated in FIG. 14, the wish information storage unit 421 further includes an item "purchase wish time-limit" as compared to the wish information storage unit 121 illustrated in FIG. 3. The "purchase wish time-limit" indicates a time-limit until which the user wishes to purchase an item and is information transmitted by the user device 10.

Providing Information Storage Unit 424

FIG. 15 illustrates an example of the provision information storage unit 424 according to the third embodiment. In the example illustrated in FIG. 15, the provision information storage unit 424 includes items including "user ID," "purchase wish item," "purchase wish time-limit," and "provision information." The "user ID" corresponds to the user ID illustrated in FIG. 14. The "purchase wish item" corresponds to the purchase wish item illustrated in FIG. 14. The purchase wish time-limit corresponds to the purchase wish time-limit illustrated in FIG. 14. The "provision information" indicates the provision information received from the provider device 200.

The provision information storage unit 424 according to the third embodiment stores only one piece of provision information with respect to the same user ID and purchase wish item. Specifically, even when the information providing apparatus 400 has received the provision information from a plurality of provider devices 200, only the provision information of which the condition is best is stored in the provision information storage unit 424. This will be described later.

Wish Information Receiving Unit 431

The wish information receiving unit 431 receives the purchase wish information, the position information, and the purchase wish time-limit from the user device 10. That is, the wish information receiving unit 431 receives the provision information request that further includes the purchase wish time-limit from the user device 10 as compared to the wish information receiving unit 131 according to the first and second embodiments. Moreover, the wish information receiving unit 431 stores the purchase wish information, the position information, and the purchase wish time-limit received from the user device 10 in the wish information storage unit 421. Moreover, the wish information receiving unit 431 stores the purchase wish information and the purchase wish time-limit received from the user device 10 in the provision information storage unit 424.

Transmitting Unit 433

The transmitting unit 433 transmits the purchase wish information and the purchase wish time-limit stored in the wish information storage unit 421 to the provider device 200 of a shop (a service provider) in which the determining unit 132 determines that the moving cost satisfies a predetermined condition. That is, the transmitting unit 433 transmits the purchase wish time-limit additionally to the provider device 200 as compared to the transmitting unit 133 according to the first and second embodiments.

Providing Information Receiving Unit 434 and Publicizing Unit 436

The provision information receiving unit 434 and the publicizing unit 436 hold an auction for granting the right to sell a purchase wish item to the user of the user device 10 to the shop (the service provider) in which the determining unit 132 determines that the moving cost satisfies the predetermined condition.

Specifically, the publicizing unit 436 publicizes the provision information stored in the provision information storage unit 424 to the provider device 200 of the shop in which the determining unit 132 determines that the moving cost satisfies the predetermined condition until the purchase wish time-limit stored in the provision information storage unit 424. Moreover, the provision information receiving unit 434 updates the provision information stored in the provision information storage unit 424 with the provision information received from the provider device 200 when the provision information having a higher condition than the provision information stored in the provision information storage unit 424 is received from the provider device 200.

For example, upon receiving an access request from the provider device 200, the publicizing unit 436 transmits information indicating an auction, an HTML screen including the purchase wish item, the purchase wish time-limit, and the provision information stored in the provision information storage unit 424, and the like to the provider device 200. That is, the publicizing unit 436 allows the respective shops (the respective service providers) to bid the provision information with higher conditions by publicizing the provision information with the best condition at the present point in time to the respective shops. Moreover, when the provision information with a higher condition is transmitted (bid) from the provider device 200, the provision information receiving unit 434 stores the provision information in the provision information storage unit 424.

The provision information receiving unit 434 determines the level of the condition of the provision information based on the sales price or the like. For example, the provision information receiving unit 434 determines that the lower the sales price, the higher the condition of the provision information. Moreover, the present application is not limited to this, and the provision information receiving unit 434 may determine that the lower the sales price and the larger the stock quantity, the higher the condition of the provision information.

Notifying Unit 435

The notifying unit 435 notifies the user device 10 of the provision information stored in the provision information storage unit 424 when the purchase wish time-limit stored in the provision information storage unit 424 is reached. That is, the notifying unit 435 notifies the user device 10 of only the provision information with the highest condition among the respective pieces of provision information bid by the respective shops.

Pre-Ordering Unit 437

When a pre-order request for pre-ordering the purchase wish item is received from the user device 10, the pre-ordering unit 437 transmits pre-order information to the provider device 200 of the shop that sells the purchase wish item. Specifically, when the pre-order request for the provision information notified by the notifying unit 435 is received from the user device 10, the pre-ordering unit 437 asks the shop to leave the purchase wish item in stock by transmitting the pre-order information to the provider device 200 that transmitted the provision information.

The pre-ordering unit 437 may receive a request to cancel the pre-order at the shop from the user device 10. In this case, the pre-ordering unit 437 transmits cancel information indicating the cancellation of the pre-order for purchasing an item to the provider device 200 that transmitted the pre-order information. At that time, the pre-ordering unit 437 may notify the user device 10 of the fact that a cancel charge on the provider device 200 will incur.

Screen Example of User Device 10

Next, the process of the user device 10 according to the third embodiment will be described. The configuration of the user device 10 according to the third embodiment is the same as that illustrated in FIG. 7, and a description thereof will not be provided. FIG. 16 is a diagram illustrating an example of a screen displayed on the real application control unit 16 according to the third embodiment.

Figure 16A:
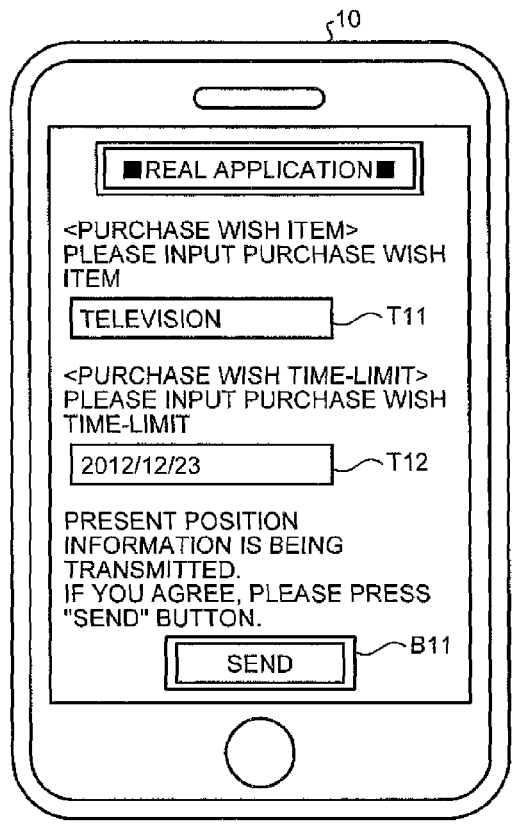
FIGS. 16A and 16B are diagrams illustrating an example of an example of a screen displayed on a real application control unit according to the third embodiment.

The requesting unit 17 according to the third embodiment displays a request input screen illustrated in FIG. 16A on the display unit 12 when the user inputs an operation to activate the real application. The request input screen includes a wish time-limit input field T12 for inputting a purchase wish time-limit in addition to the wish item input field T11 and the send button B11. FIG. 16A illustrates an example in which the user inputs "2012/12/23" in the wish time-limit input field T12. When the send button B11 is pressed in this state, the requesting unit 17 transmits the provision information request including the purchase wish information "television" input in the wish item input field T11, the purchase wish time-limit "2012/12/23" input in the wish time-limit input field T12, and the position information of the user device 10 to the information providing apparatus 400.

After that, when the receiving unit 18 receives the provision information from the notifying unit 435 of the information providing apparatus 400, the display control unit 19 controls the display unit 12 to display a providing information screen illustrated in FIG. 163. In the example of FIG. 163, the display control unit 19 controls the display unit 12 to display the providing information screen including the provision information R11 of the shop A11 and a pre-order button B21. In this state, when the pre-order button B21 is pressed, the requesting unit 17 transmits a pre-order request for pre-ordering the purchase wish item "television" sold at the shop A11 to the information providing apparatus 100. The pre-ordering unit 437 of the information providing apparatus 100 having received the pre-order request transmits pre-order information including the user ID, the purchase wish item, and the like to the provider device $200_1$ corresponding to the shop A11.

3-2. Effects

As described above, the information providing apparatus 400 according to the third embodiment includes the provision information storage unit 424, the wish information receiving unit 431, the transmitting unit 433, the publicizing unit 436, the provision information receiving unit 434, and the notifying unit 435. The provision information storage unit 424 stores the provision information received by the provision information receiving unit 434. The wish information receiving unit 431 receives a purchase wish time-limit (an example of a wish time-limit) until which the user wishes to purchase the purchase wish item from the user device 10 together with the purchase wish information and the position information. The transmitting unit 433 transmits the purchase wish information received by the wish information receiving unit 431 to a plurality of provider devices 200. The publicizing unit 436 publicizes the provision information stored in the provision information storage unit 424 to a plurality of provider devices 200 until the purchase wish time-limit is reached. When the provision information with a higher condition than the provision information publicized by the publicizing unit 436 is received from the provider device 200 until the purchase wish time-limit is reached, the provision information receiving unit 434 updates the provision information stored in the provision information storage unit 424 with the provision information with the high condition. The notifying unit 435 notifies the user device 10 of the provision information stored in the provision information storage unit 424 when the purchase wish time-limit is reached.

In this manner, the information providing apparatus 400 according to the third embodiment can allow the service provider to bid the provision information with a high condition by holding an auction for the right to sell. As a result, the information providing apparatus 400 can notify the user device 10 of the provision information with a higher condition.

Moreover, in the information providing apparatus 400 according to the third embodiment, when the pre-order request for pre-ordering the purchase wish item provided by a predetermined service provider is received from the user device 10, the pre-ordering unit 437 transmits pre-order information that the purchase wish item is pre-ordered to the provider device 200 of the predetermined service provider.

In this manner, the information providing apparatus 400 of the third embodiment can improve the services to users by providing a pre-order service, and as a result, can increase the number of users using the information providing apparatus 400.

Other Embodiments

The information providing system 1 according to the above-described embodiments may be embodied in various other forms other than the above embodiments. Thus, other embodiments of the information providing system 1 will be described. The other embodiments will be described by way of the information providing apparatus 100 according to the first embodiment, and the other embodiments can be equally applied to the second and third embodiments.

4-1. Transmission Destination of Purchase Wish Information

In the above-described embodiments, an example in which the information providing apparatus 100 transmits the purchase wish information to the provider device 200 of a shop in which the moving cost satisfies the predetermined condition has been described. However, the transmitting unit 133 of the information providing apparatus 100 may transmit the purchase wish information of all provider devices 200 corresponding to shops (service providers) of which the distance from the present location of the user indicated by the position information received from the user device 10 is a predetermined value or smaller. That is, the provision information receiving unit 134 can receive the provision information from the respective provider devices 200 having received the purchase wish information transmitted by the transmitting unit 133. In this case, the determining unit 132 determines with respect to all shops corresponding to the provider devices 200 that transmitted the provision information whether the moving cost satisfies the predetermined condition. Moreover, the notifying unit 135 notifies the user device 10 of the provision information of the shop (the service provider) in which the determining unit 132 determines that the moving cost satisfies the predetermined condition. Even in the case of this processing, the information providing apparatus 100 can also provide the same advantages as those of the first embodiment described above.

In the third embodiment, the provision information receiving unit 434 may store only the provision information of the shop (the service provider) in which the determining unit 132 determines that the moving cost satisfies the predetermined condition among the respective pieces of provision information received from the provider device 200 in the provision information storage unit 424.

4-2. Pre-Order

Figure 16B:
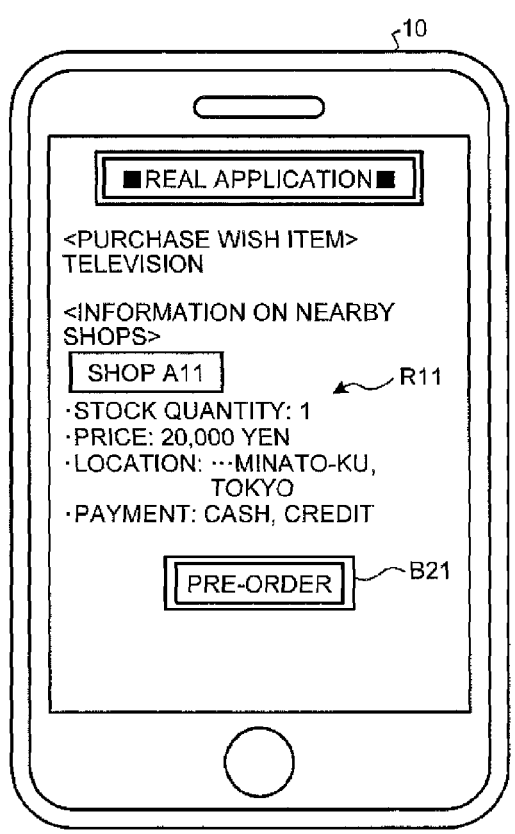

Although the third embodiment has described an example of pre-ordering the purchase wish item, the process of pre-ordering the purchase wish item may be applied to the first and second embodiments. That is, the information providing apparatuses 100 and 300 may include the same pre-ordering unit 437 as the information providing apparatus 400. For example, in the first embodiment, the pre-order button B21 illustrated in FIG. 16B is displayed for each shop (provision information) in the providing information screen illustrated, in FIG. 9B. In this case, the real application control unit 16 of the user device 10 may control such that a plurality of shops cannot be pre-ordered for the same item.

Moreover, in the above-described embodiments, an example in which the information providing apparatus 100 notifies the user device 10 of the provision information has been described. However, the notifying unit 135 of the information providing apparatus 100 may notify the user device 10 of the moving cost together with the provision information when the provision information is received from the provider device 200. The moving cost referred herein indicates a transportation cost, a travel time, a digitized travel labor, or the like. In this way, the information providing apparatus 100 can provide more reliable information to the user device 10.

In the above example, at first the notifying unit 135 may notify the user device 10 of the moving cost only even when the provision information is received from the provider device 200. Moreover, the notifying unit 135 may notify the user device 10 of only the provision information of the pre-ordered shop when the purchase wish item is pre-ordered after the notification of the moving cost. In this way, the information providing apparatus 100 can prevent the provision information from being used simply for estimation of the item.

4-3. Position Information

In the above-described embodiment, the present location has been described as an example of the position information that the user device 10 transmits to the information providing apparatus 100. However, the user device 10 may transmit the position information of an expected location at which the user is likely to be present in the future without limiting to the present location. In this case, the user device 10 inputs an expected location where the user is likely to be present in the future in the request input screen illustrated in FIG. 9A or FIG. 16A. In this way, the user can view the provision information of an item at a shop in which the moving cost required for moving from a workplace or a travel destination satisfies a predetermined condition by inputting the workplace, the travel destination, or the like in the request input screen, for example.

Moreover, without limiting to the above example, the user device 10 may transmit, to the information providing apparatus 100, an action schedule including an expected location at which the user is likely to be present in the future, purchase wish information that the user wishes to purchase at the expected location, and an expected time in which the user is expected to be present at the expected location. In this case, when the expected time is reached after a predetermined period (for example, one hour or one day), the notifying unit 135 notifies the user device 10 of the provision information of the shop in which the moving cost required for moving from the expected location satisfies the predetermined condition among the shops that sell the purchase wish item indicated by the purchase wish information. In this way, the user of the user device 10 can view the provision information corresponding to the action schedule by just transmitting the action schedule to the information providing apparatus 100.

The information providing apparatus 100 may receive the purchase wish information and the position information from the user device 10 at different points in time. For example, the information providing apparatus 100 receives the purchase wish information in advance from the user device 10. Moreover, when the user device 10 uses a route retrieval service provided on the Internet, the information providing apparatus 100 acquires a departure station, an arrival station, a train use period, or the like input in the route retrieval service from a server device that provides the route retrieval service. Moreover, when the train use period is reached after a predetermined period (for example, one hour or one day), the information providing apparatus 100 notifies the user device 10 of the provision information of the shop in which the moving cost required for moving from the departure station or the arrival station satisfies the predetermined condition among the respective shops that sell the purchase wish item indicated by the purchase wish information received in advance. In this way, the user of the user device 10 can view the provision information corresponding to the action schedule without transmitting the action schedule to the information providing apparatus 100. In this example, the server device that provides the route retrieval service may be the information providing apparatus 100 and may be another server device that is not illustrated in FIG. 1. When another server device provides the route retrieval service, the information providing apparatus 100 is communicably connected to the other server device and acquires the departure station, the arrival station, the train use period, and the like from the user device 10 via the other server device.

4-4. User Designated Moving Cost

Moreover, in the above-described embodiments, the items included in the moving cost used in the determining unit 132 may be designated by the user. Specifically, the user device 10 may allow the user to select an item such as a transportation cost, a travel time, or a travel labor on the request input screen illustrated in FIG. 9A or FIG. 16A. In this case, the user device 10 may allow the user to select a plurality of items and to designate a weight of each item after the plurality of items is selected. The user device 10 transmits the item or the weight of the moving cost selected or designated by the user to the information providing apparatus 100. In this case, the determining unit 132 of the information providing apparatus 100 calculates the moving cost based on the moving cost item and the weight thereof received from the user device 10. For example, when the moving cost item "transportation cost" is received, the determining unit 132 determines whether the "transportation cost" satisfies the predetermined condition. Moreover, when the moving cost items "transportation cost" and "travel labor" and the weights "0.8" and "0.2" of the "transportation cost" and "travel labor" are received, the determining unit 132 calculates the moving cost in which the "transportation cost" and the "travel labor" are reflected in the ratio of "4:1" and determines whether the calculated moving cost satisfies the predetermined condition.

In this manner, the information providing apparatus 100 can notify the user device 10 of the provision information of the shop desired by the user by allowing the user to designate the moving cost. As a result, the information providing apparatus 100 can allow the user to purchase an item and contribute to improvement in the profit of the shop.

4-5. Multiple Users

Moreover, in the above-described embodiments, an example in which a service provider sells an item at a shop has been described. However, as described in the beginning of the first embodiment, the service provider may provide a dish in a restaurant, provide a service (for example, a haircut) related to hair-dressing in a barber's shop, and provide a service related to legal consultation in an office. In this case, the user device 10 allows the user to input a desired service (for example, a dish in a restaurant, a haircut, legal consulting, or the like) that the user wishes to use in the request input screen illustrated in FIG. 9A or FIG. 16A. The "items" described in the above embodiments can be read "services."

Similarly to the above example, when the user wishes to have "a dish in a restaurant (for example, a bar)," the information providing apparatus 100 may calculate the moving cost of the respective users associated with the "dish in a restaurant" and determine whether the sum of the calculated moving costs satisfy the predetermined condition. Moreover, the information providing apparatus 100 may notify the respective user devices 10 of the provision information of the shop that satisfies the predetermined condition. Hereinafter, an example in which the sum of the moving costs corresponding to a plurality of users is used will be described.

For example, when the purchase wish information and the position information are received from a plurality of user devices 10 within a predetermined period, the determining unit 132 determines whether the plurality of users corresponding to the plurality of user devices 10 has mutual relations. As an example, the determining unit 132 acquires information relevant to a social group formed by friends from a predetermined social network service (SNS) service or the like and determines whether the users of the plurality of user devices 10 has a friendship. Moreover, the determining unit 132 determines whether the sum of the moving costs corresponding to the respective users having a friendship satisfies the predetermined condition. In this case, the transmitting unit 133 transmits the purchase wish information received from the user device 10 to the provider device 200 of the shop (the service provider) in which it is determined that the sum of the moving costs satisfies the predetermined condition.

Moreover, without limiting to the above example, the wish information receiving unit 131 may receive the purchase wish information and the position information from a plurality of user devices 10 together with information (for example, an optional group ID) indicating that the users have mutual relations. In this case, the determining unit 132 calculates the moving cost of the respective user devices 10 that transmitted the same group ID and determines whether the sum of the calculated moving costs satisfies the predetermined condition.

In this manner, the information providing apparatus 100 can notify the user device 10 of such a restaurant that the average moving cost of the respective users associated with the "dish in a restaurant" is low averagely, for example, by determining whether the sum of the moving costs of the respective users having mutual relations satisfies the predetermined condition.

4-6. Others

All or some of the processes described as being automatically performed among the processes described in the above embodiments may be performed manually. Alternatively, all or some of the processes described as being performed manually may be performed automatically according to an existing method. Moreover, the information including the processing sequence, specific names, various types of data and parameters illustrated in the document and drawings can be changed optionally unless stated explicitly. For example, the various types of information stored in the storage unit illustrated in the respective drawings including FIG. 3 are not limited to the illustrated information.

Moreover, the respective constituent components of the respective illustrated devices are conceptual for describing functions and do not need to be physically configured as depicted in the drawings. That is, concrete forms of distribution and integration of the respective devices are not limited to those depicted in the drawings, and all or some of the devices can be configured to be functionally or physically distributed and integrated in optional units depending on various loads and use conditions.

Moreover, "means" described in the claims can be substituted with "section," "module," "unit," "circuit," or the like. For example, a wish information receiving means can be substituted with a wish information receiving unit or a wish information receiving circuit.

According to an aspect of the embodiment, it is possible to provide the information relevant to a shop at which a user can practically purchase an item.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information providing apparatus comprising:
    a processor programmed to:
        receive wish information relevant to a wish item or a wish service that a user wishes to have and position information of the user from a user device that the user uses;
        determine whether a moving cost, which is required for moving from a position indicated by the position information to a providing place at which a provider provides the wish item or the wish service, satisfies a predetermined condition;
        transmit the received wish information to a provider device of the provider when the moving cost corresponding to the provider is determined as satisfying the predetermined condition;
        receive provision information relevant to provision of the wish item or the wish service from the provider device; and
        notify the user device of the provision information corresponding only to the provider in which the moving cost is determined as satisfying the predetermined condition, wherein:
    when respective users of a plurality of user devices have relations, the processor determines whether the sum of moving costs corresponding to the pieces of position information transmitted by the plurality of user devices satisfies a predetermined condition, and
    the processor notifies the plurality of user devices of the provision information corresponding to a provider in which the processor determines that the sum of the moving costs satisfies the predetermined condition.

2. The information providing apparatus according to claim 1, wherein
    the processor transmits the wish information to a provider device of the provider in which the processor determines that the moving cost satisfies the predetermined condition,
    the processor receives the provision information as a response to reception of the wish information transmitted by the provider device, and
    the processor notifies the user device of the received provision information as the provision information of the provider in which the moving cost satisfies the predetermined condition.

3. The information providing apparatus according to claim 1, wherein
    the processor transmits the received wish information to the provider device of the provider of which the distance from the position indicated by the position information to the providing place is a predetermined value or smaller,
    when the provision information is received by the processor, the processor determines with respect to the provider corresponding to the provider device that transmitted the provision information whether the moving cost satisfies the predetermined condition, and
    the processor notifies the user device of the provision information of the provider in which the moving cost is determined as satisfying the predetermined condition among the respective pieces of provision information.

4. The information providing apparatus according to claim 1, further comprising:
    a memory storing the price of each of the items or the services, wherein
    the processor changes the predetermined condition according to the price stored in the memory in correlation with the wish item or the wish service and determines whether the moving cost satisfies the predetermined condition.

5. The information providing apparatus according to claim 1, further comprising:
    a memory storing the received provision information; and
    the processor is programmed to publicize the provision information stored in the memory to a plurality of provider devices, wherein
    the processor receives a wish time-limit until which the user wishes to have the wish item or the wish service from the user device together with the wish information and the position information,
    the processor transmits the received wish information to the plurality of provider devices,
    the processor publicizes the provision information stored in the memory to the plurality of provider devices until the wish time-limit is reached,
    when provision information with a higher condition than the provision information publicized by the processor is received from the provider device until the wish time-limit, the processor updates the provision information stored in the memory with the provision information with the high condition, and
    the processor notifies the user device of the provision information stored in the memory when the wish time-limit is reached.

6. The information providing apparatus according to claim 1, wherein the processor is further programmed to:
    to transmit, when a pre-order request for pre-ordering the wish item or the wish service provided by a predetermined provider is received from the user device, pre-order information for pre-ordering the wish item or the wish service to a provider device of the predetermined provider.

7. The information providing apparatus according to claim 6, wherein
the processor notifies the user device of the determined moving cost to satisfy the predetermined condition and notifies the user device of the provision information corresponding to a pre-ordered provider when the pre-order unit receives a pre-order request from the user device.

8. The information providing apparatus according to claim 1, wherein
the processor receives a present location of the user device or information relevant to a position at which the user is likely to be present in the future as the position information.

9. The information providing apparatus according to claim 1, wherein
the processor uses at least one of a transportation cost, a travel time, and a travel labor based on a moving method as the moving cost and determines that the moving cost satisfies the predetermined condition when the transportation cost, the travel time, or the travel labor is a predetermined threshold value or smaller.

10. An information providing method executed by an information providing apparatus, the method comprising:
receiving wish information relevant to a wish item or a wish service that a user wishes to have and position information of the user from a user device that the user uses;
transmitting the wish information received by the wish information receiving unit to a provider device used by a provider who provides items or services;
receiving provision information relevant to provision of the wish item or the wish service from the provider device;
determining whether a moving cost, which is required for moving from a position indicated by the position information to a providing place at which the provider provides the wish item or the wish service, satisfies a predetermined condition; and
notifying the user device of the provision information corresponding only to a provider in which the moving cost is determined as satisfying the predetermined condition, wherein:
when respective users of a plurality of user devices have relations, the sum of moving costs corresponding to the pieces of position information transmitted by the plurality of user devices is determined on whether a predetermined condition is satisfied, and
the plurality of user devices of the provision information corresponding to provider is notified if the sum of the moving costs satisfies the predetermined condition.

11. A non-transitory computer-readable storage medium having stored therein an executable information providing program causing a computer to execute a process, the process comprising:
receiving wish information relevant to a wish item or a wish service that a user wishes to have and position information of the user from a user device that the user uses;
transmitting the wish information received by the wish information receiving process to a provider device used by a provider who provides items or services;
receiving provision information relevant to provision of the wish item or the wish service from the provider device;
determining whether a moving cost, which is required for moving from a position indicated by the position information to a providing place at which the provider provides the wish item or the wish service, satisfies a predetermined condition; and
notifying the user device of the provision information corresponding only to a provider in which the moving cost is determined as satisfying the predetermined condition, wherein:
when respective users of a plurality of user devices have relations, the sum of moving costs corresponding to the pieces of position information transmitted by the plurality of user devices is determined on whether a predetermined condition is satisfied, and
the plurality of user devices of the provision information corresponding to a provider is notified if the sum of the moving costs satisfies the predetermined condition.

12. A user device comprising:
a processor programmed to:
transmit wish information relevant to a wish item or a wish service that a user wishes to have and position information of the user to an information providing apparatus to request the information providing apparatus to transmit provision information relevant to provision of the wish item or the wish service;
transmit the wish information to a provider device used by a provider who provides items or services to receive provision information corresponding only to a provider, in which a moving cost required for moving from a position indicated by the position information to a providing place at which the wish item or the wish service is provided by the provider satisfies a predetermined condition, from the information providing apparatus that received the provision information from the provider device; and
control a predetermined display to display the received provision information, wherein:
when respective users of a plurality of user devices have relations, the processor determines whether the sum of moving costs corresponding to the pieces of position information transmitted by the plurality of user devices satisfies a predetermined condition, and
the processor notifies the plurality of user devices of the provision information corresponding to a provider in which the processor determines that the sum of the moving costs satisfies the predetermined condition.

\* \* \* \* \*